United States Patent [19]

Wilder et al.

[11] Patent Number: 5,128,928
[45] Date of Patent: Jul. 7, 1992

[54] DIGITAL RADIO TELEPHONE SYSTEM

[75] Inventors: Ronald P. Wilder, Campbell; Gregory Pierce, Stockton, both of Calif.; Richard C. Frey, Boulder; Whitney E. Childs-Goodrich, Louisville, both of Colo.; David L. Needle, Alameda, Calif.

[73] Assignee: Rose Communications, Inc., Santa Clara, Calif.

[21] Appl. No.: 609,000

[22] Filed: Oct. 31, 1990

[51] Int. Cl.[5] .................. H04Q 11/04; H04J 3/16
[52] U.S. Cl. ................ 370/58.1; 370/62; 370/100.1; 370/110.2; 455/54.1; 375/108
[58] Field of Search .......... 370/62, 66, 67, 85.1, 370/95.1, 95.3, 110.2; 379/58, 63; 455/34, 53, 54, 56, 55; 375/108, 120

[56] References Cited

U.S. PATENT DOCUMENTS 4,268,722  5/1981  Little et al. ................ 370/62
5,022,024  6/1991  Paneth et al. ............. 370/95.1

Primary Examiner—Douglas W. Olms
Assistant Examiner—Temesghen Ghebretinsae
Attorney, Agent, or Firm—Blakely, Sokoloff, Taylor & Zafman

[57] ABSTRACT

The telephone system of the present invention is realized by a unique dynamic time slice architecture which allows for up to 480 transfers of data. A dual port RAM is utilized in which are stored two pages of data, containing time slice information identifying the sending and receiving devices for each time slice slot within the frame. The time slice configuration can be easily modified to accommodate a change in the current system configuration, for example, a handset connecting or disconnecting from a central office line, or the initiation of a conference call. The time slice configuration is modified by updating the second page and swapping the two pages at the beginning of the next frame so that the time slice controller accesses the second page and the configurations specified therein. Thus the system can be updated and controlled in real time with no delays to the users of the telephone system. The telephone system of the present invention further provides a dynamic conferencing capability which can accommodate a large number of users with no additional circuitry and little additional system overhead. The conferencing circuit linearly combines digitized audio data received from different sources over successive time slice slots in a single frame on a real time basis wherein parties can be added or removed simply by adding or removing the connections to the time slice slots.

37 Claims, 18 Drawing Sheets

AUDIO SIGNAL FLOW

TIME SLICE TIMING

| SOURCE | ATTRIBUTE A | DESTINATION | ATTRIBUTE B |
|---|---|---|---|
| CO LINES | CO 1<br>CO 2<br>CO 3<br>CO 4 | CO LINES | CO 1<br>CO 2<br>CO 3<br>CO 4 |
| TONE | TONE 1<br>TONE 2<br>TONE 3<br>TONE 4<br>TONE 5<br>TONE 6<br>TONE 7<br>TONE 8 | | |
| VOLUME | | VOLUME | TABLE 1<br>TABLE 2<br>TABLE 3<br>TABLE 4<br>TABLE 5<br>TABLE 6<br>TABLE 7<br>TABLE 8<br>TABLE 9<br>TABLE 10<br>TABLE 11<br>TABLE 12<br>TABLE 13<br>TABLE 14<br>TABLE 15<br>TABLE 16 |
| CONFERENCE | | CONFERENCE | |

*Fig. 11*

SLOT 200 - CO LINE 1 TO VOLUME TABLE 3
SLOT 201 - VOLUME TO RADIO 1, RF LINK 1
SLOT 202 - RADIO 1, RF LINK 1 TO VOLUME TABLE 4
SLOT 203 - VOLUME TO CO LINE 1

DUAL PORT

| | | | | |
|---|---|---|---|---|
| 400 | VOLUME | 660 | CO LINES | 650 |
| 401 | TABLE 3 | 670 | CO LINE 1 | 665 |
| 402 | RADIO 1 | | VOLUME | |
| 403 | RF LINK 1 | | | |
| 404 | VOLUME | | RADIO 1 | |
| 405 | TABLE 4 | | RF LINK 1 | |
| 406 | CO LINES | | VOLUME | |
| 407 | CO LINE 1 | | | |

*Fig. 14*

DIGITAL RADIO TELEPHONE SYSTEM

BACKGROUND OF THE INVENTION

1. Field of the Invention

The system of the present invention relates to the field of radio telephones. Specifically the system of the present invention relates to a multi-user radio telephone system which operates in a proximal environment.

2. Art Background

Use of radio or "cordless" telephones have become quite popular because they give the user of the radio telephone mobility previously not had with a corded telephone. Such telephones are easily found on the commercial market, and have enjoyed widespread use. Typically, such cordless phones are connected individually to the central office telephone lines through a base unit physically connected to the telephone lines which connect to the central office. The base unit also contains a radio transceiver to transmit the voice information to the cordless handset and receive radio transmissions containing voice information from the handset. In a business environment, a business typically operates its own local telephone network within the office to provide such capabilities as intercom between phones, conferencing among phones, as well as to minimize the number of required central office lines to service all the phone users in the office (because not all users use the phone simultaneously). Most businesses use a private branch exchange (PBX) or multiple line key system (Key) to perform these functions.

The limitations of a corded system in a business environment is quite evident. The relocation of offices requires a change of phone number or reconfiguration/rewiring of the telephone system to move the phone to a different location. Furthermore, work efficiency is decreased by not being available near the office phone when incoming calls arrive. However, difficulties arise in providing the functionality of corded telephones to the radio telephones. The information used to control the status of the phone system must be operated in a real time manner and communicated to the cordless handsets in a real time manner in order to provide full functionality that the corded handsets provide in a sophisticated business telephone system. Furthermore, this sophisticated functionality must be provided while maintaining voice transmission quality. However, it has been found that due to the amount of functionality required, such systems are difficult to design and implement. Typically the user will experience degradation in telephone sound quality and/or slight delays between transmissions in order to increase the functionality of the system.

The use of a telephone conferencing capability has become a popular means for more than two people to communicate concurrently over the phone. However a telephone system's conferencing capability is typically limited to a few users in the number that can be conferenced during a call due to the amount of circuitry and system overhead required to support a conferencing capability. Additional conferencing circuits have been implemented with "conference bridges" that externally attach to ports on a PBX or Key system. Each port corresponds to a participant in the conference. Therefore, for a four party conference call, four additional analog ports on the PBX or Key system are required to accommodate all conference participants, only one conference call can take place per conference bridge and four analog ports are dedicated to this function.

Though newer implementations of conference circuits perform conferencing internally (some even do it digitally), there is still one (or more) dedicated pieces of hardware that performs "a conference". If more than one simultaneous conferences are desired, more dedicated hardware must be added. Each of these conference circuits, takes up either a physical port or a "time-slot" per conference participant. These systems are limited by either the number of conference participants or the number of simultaneous conferences that can be in progress at any one time.

SUMMARY OF THE INVENTION

It is therefore an object of the present invention to provide a non-blocking, real time telephone system architecture to control a multiple handset radio system.

It is an object of the present invention to provide a real time telephone conference capability which can support multiple cordless handsets in a radio telephone system with little system overhead.

The telephone system of the present invention is realized by a unique dynamic time slice architecture which allows for up to 480 transfers of data within one frame. A dual port RAM is utilized in which are stored two pages of data, containing time slice information identifying the sending and receiving devices for each time slice slot within the frame.

The time slice configuration can be easily modified to accommodate a change in the current system configuration, for example, a handset connecting or disconnecting from a central office line, or the initiation of a conference call. The time slice configuration is modified by updating the second page and swapping the two pages at the beginning of the next frame so that the time slice controller accesses the second page and the configurations specified therein. Thus the system can be updated and controlled in real time with no delays to the users of the telephone system. The telephone system of the present invention further provides a dynamic conferencing capability which can accommodate a large number of users with no additional circuitry and little additional system overhead. The conferencing circuit linearly combines digitized audio data received from different sources over successive time slice slots in a single frame on a real time basis wherein parties can be added or removed simply by adding or removing the connections to the time slice slots.

BRIEF DESCRIPTION OF THE DRAWINGS

The objects, features and advantages of the telephone system of the present invention will be apparent to those skilled in the art in light of the following detailed description of the invention in which:

FIG. 11 illustrates the information utilized to control the time slice bus in the telephone system of the present invention.

FIG. 14 is an example which illustrates the use of a plurality of time slice slots to provide the connections among the different components during a frame in the telephone system of the present invention.

DETAILED DESCRIPTION OF THE INVENTION

A local telephone system is provided in which the handsets utilized in the system are connected to the system through radio links (i.e., the handsets are cordless), but contain all the features found in existing local telephone systems which employ corded handsets. The system provides a non-blocking real time cordless telephone system which may be used in a business environment. This system is non-blocking because the time slice architecture can accept and control voice information for all possible configurations. Furthermore, the telephone system of the present invention provides a real time non-blocking conferencing capability, a tone generator, secure radio transmissions, as well as a power saver to extend the usage of the cordless handset. The handsets contain a display which displays information such as the time of day and the status of the lines in the system. The structure of information transmitted from the central control unit to the handsets provides for a way of synchronizing the handsets and the main system thereby avoiding drifting and loss of voice data and for transmitting command information to the handset simultaneously with the transmission of voice data with no effect on the voice signals heard by the user of the handset. This command information includes commands to control the operation and display of the handset.

Figure 1:
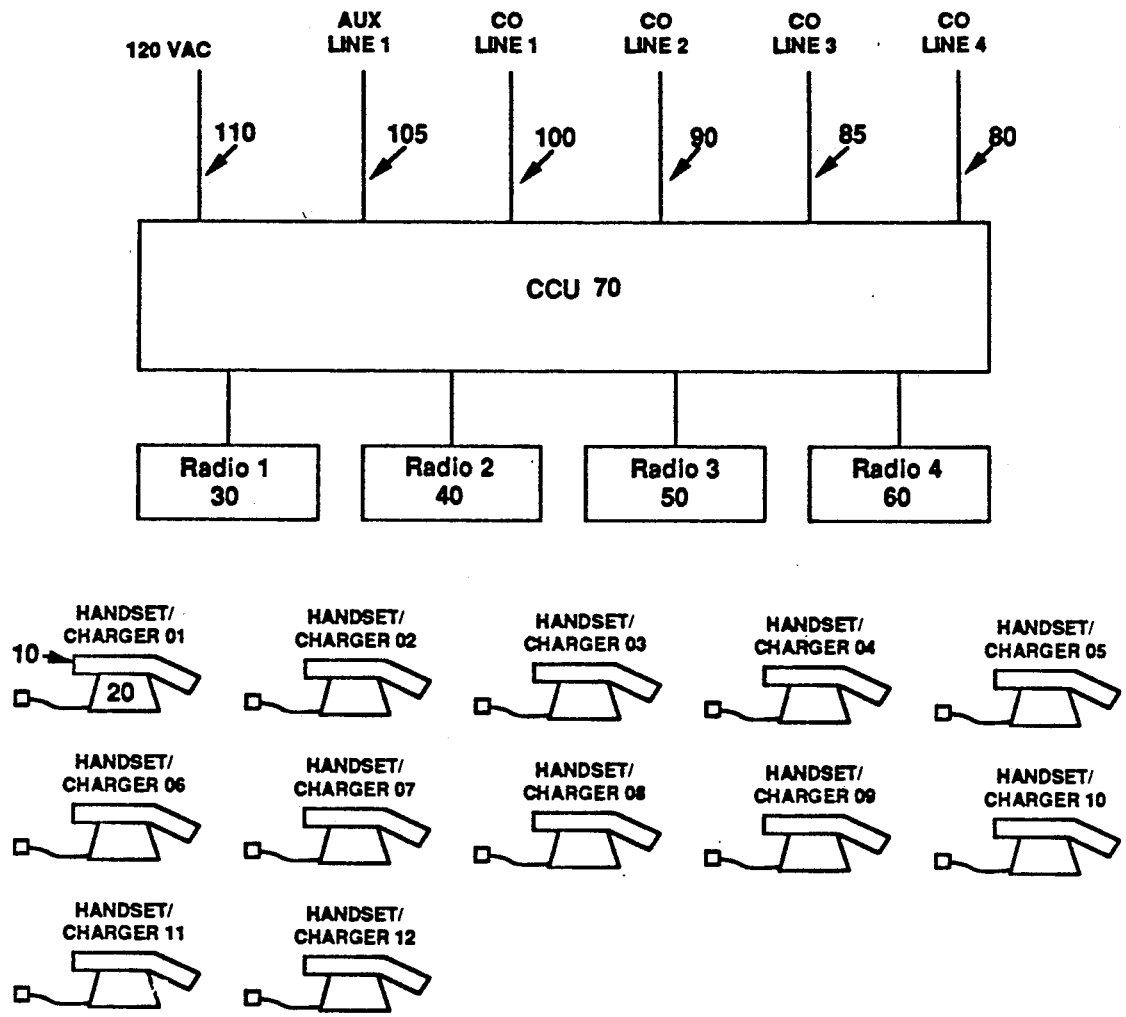
FIG. 1 is a block diagram illustration of a preferred embodiment telephone system of the present invention.

A preferred embodiment of the telephone system of the present invention is illustrated in FIG. 1. The system illustrated includes twelve (12) cordless radio telephones 10 and charging base 20 on which each phone is placed when not in use to recharge the handset 10. The charging base is connected to a power source, such as an AC outlet, to provide the power necessary to charge the handset. The handsets communicate voice data and command data via radio transmissions to an assigned radio cluster 30, 40, 50, 60 each having three radio transceivers to receive the transmitted data and input the data to the central control unit 70 (CCU). Also connected to the CCU 70 are four CO lines 80, 85, 90 100, as well as a power input 110 and an auxiliary line 105. The CCU 70 controls the operation of the telephone system and is operated via the time slice architecture which is described below.

Figure 2:
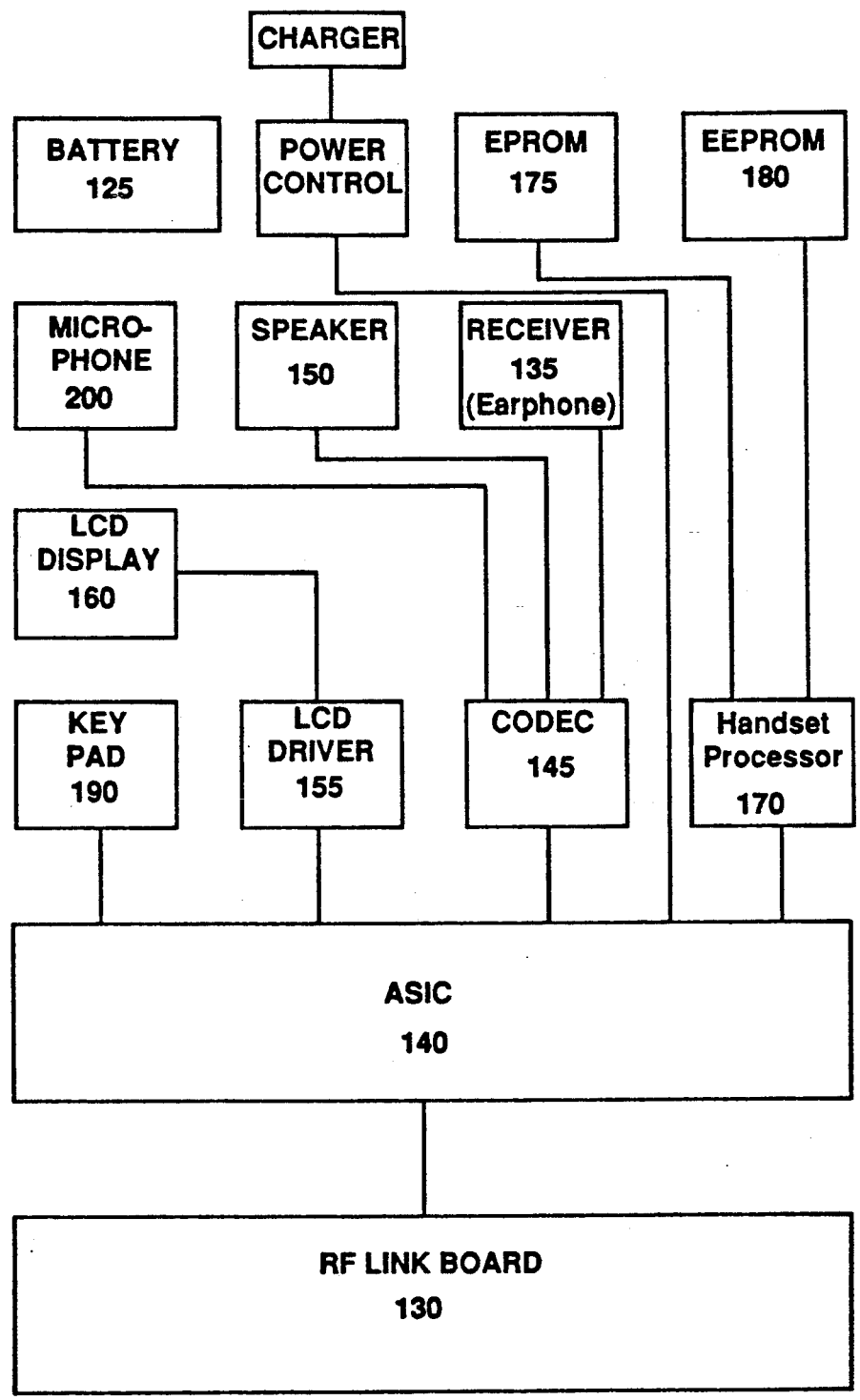
FIG. 2 is a block diagram representation of a radio handset utilized in the telephone system of the present invention.

FIG. 2 is a block diagram representation of the handset used in the telephone system of the present invention. The handset is powered by a rechargeable battery 125 which can be recharged by placing the handset on a charging base (FIG. 1). Voice information is transmitted from the handset and received into the handset from the central control unit through RF Link Board 130. For example, if voice data is received through the RF Link Board 130, this data is transmitted in serial form to the handset ASIC 140 which extracts the command data for the handset processor 170 to process, ASIC outputs the voice data to the CODEC 145 which translates the voice data from digital form to analog form. This is subsequently sent out to the receiver 150 where the listener hears the voice transmitted. As will be described more fully below, if the data transmitted contains command data, the handset ASIC 140 will recognize the command data, remove it from the voice data and output it to the handset processor for further processing. For example, if the command is to control the liquid crystal display (LCD) on the handset 160, the handset ASIC 140 will output the command information to the handset processor 170 which sends the command information to the LCD driver 155 through the handset ASIC 140 to drive the LCD to perform the action indicated by the command.

Any given handset can be in only one of four modes of operation at a time. In the registration mode, a handset identified by a unique handset ID is registered to a CCU, that is, the handset is given the authorization to communicate to the CCU. This mode is also used to remove a handset's authorization to operate in the system. The authorization prevents the intentional/unintentional handset connections by unauthorized users. A handset enters into the conversation mode when a handset has requested a telephone, intercom or paging channel and audio data transfer needs to begin. The audio channel is enabled for bi-directional transfer and the command and status information is interleaved as will be described below.

In the polling mode, a single RF link provides a polling signal on a single RF channel. The receivers of all the on-hood handsets (those currently not communicating) monitor on this channel. The CCU broadcasts to the handset for status information. The CCU ID and handset ID are transmitted as part of the broadcast so that the handset recognizes that the broadcast is directed to that handset. The response sent back by the handset can include information such as key closure or release, power and signal strength information or other status. The CCU updates, according to the information received, the database of information it retains on the status of the system. Lack of response by a handset may indicate that the handset is currently operating in another mode or the handset is inoperable or out of range. This mode is also utilized to send both ring and page audio signals to any handset monitoring the polling channel as well as any other broadcast messages to be sent to the handsets. The RF link allocated is determined according to the RF link usage of the system. Preferably the CCU will utilize the first available RF link and if all RF links are in use or if the CCU requires an RF link to provide a conversation channel and all others are in use, the polling RF link will be relinquished and the polling channel will idle until a RF link is available.

The sleep mode provides the means for the handsets to extend the battery life by reducing power consumption without completely disconnecting from the system. So as to not miss calls, the handset "wakes up" periodically on the polling channel, waits for a poll to see if the handset needs to respond, and if the handset does not need to respond, the handset goes back to sleep. The entire handset (except for a few low powered devices) is powered down during the sleep cycle. The handset is powered off long enough to extend the battery life, but not so long as to unduly delay the reception of a ring signal. Preferably the power off time is in the range of 6–10 seconds. During the process of waking up (i.e, the handset powers up), the phase lock loop circuit requires time to lock to the local oscillator frequency. Prior to that time, the local oscillator frequency is indeterminate and could cause interference to another handset or system by randomly transmitting into the airwaves and damaging ongoing communications. Thus the antenna handset is prevented from transmitting until the phase locked loop stabilizes.

The handset ASIC 140 also provides input to the handset processor 170 which controls the operation of the handset according to the code stored in EPROM 175. The EEPROM 180 stores security data and serial numbers for the handsets and central control unit used for scrambling the transmitted data and descrambling the received data to provide security and prevent eavesdropping of the radio signals.

The handset ASIC 140 further monitors the keypad 190 on the handset to determine if the user of the handset has depressed any keys. The ASIC senses when a key has been depressed and transmits the information to the handset processor which builds a packet of data. This packet of data is sent back to the handset ASIC 140, specifically the UART of the ASIC, which formats and sends the data to the RF linksboard 130 for transmission of the data over the radio waves to the CCU. As will be discussed in more detail below, the ASIC incorporates the command data, such as notifying the CCU that a key has been depressed, into the format of voice data, wherein voice and command are concurrently transmitted with little degradation in voice signal quality. If the user speaks into the handset, for example when making a telephone call, the microphone 200 will pickup the user's voice, convert it to analog voice signals which are then inputted to the CODEC 145 to translate the analog voice signals into digital form in accordance with known telephone standards ($\mu$/law-a/law). [For further information on $\mu$/law-a/law, see, Roger L. Freeman, *Telecommunications Systems Engineering*, 2nd Edition, Chapter 9 (Wiley Interscience 1989).] The handset ASIC 140 receives the digital signals and the UART formats the digital signals in serial form and sends the data to RF Link Board 130 which transmits the digital voice data through the radio over the radio waves to the receiving radio.

Figure 3:
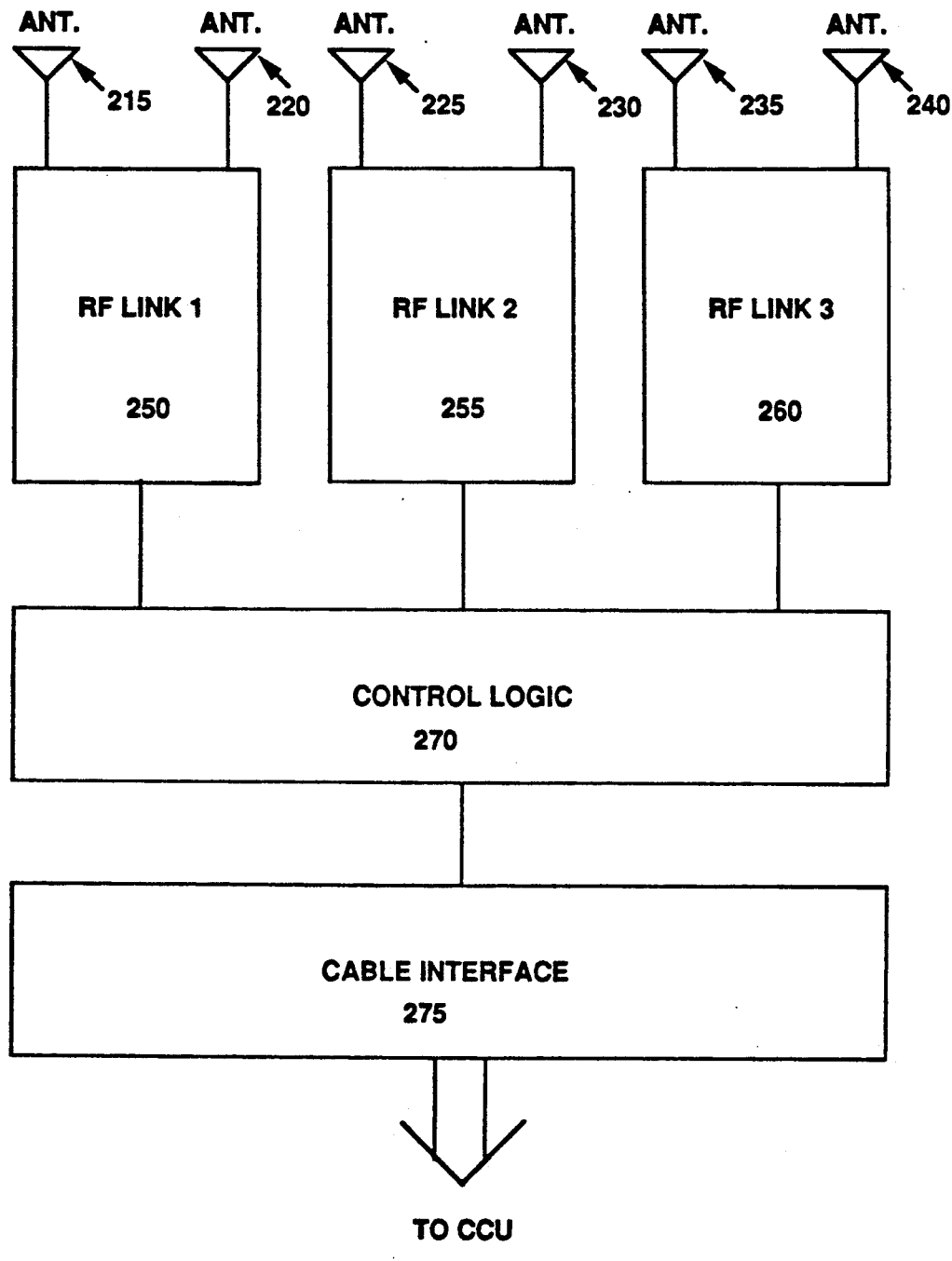
FIG. 3 is a block diagram representation of a radio interface which communicates with the radio handsets.

The RF cluster connected to the CCU which transmits and receives radio signals from the handsets is illustrated in FIG. 3. Preferably the telephone system contains four RF clusters each cluster containing three radio links (RF links). Each radio link 250, 255, 260 comprises at least one antenna 215–240 to receive the radio signal containing digital voice data transmitted by a handset and to transmit voice and command data to the handset. Circuitry connected to the antenna accepts the signal received by the antenna and transmits it to the control logic circuit 270 and receives data from the control logic circuit 270 and transmits the data out through the antenna to the handset. The control logic circuit 270 formats the data for transmission by inserting start, stop and parity bits and formats the data for receipt by the CCU by removing the start, stop and parity bits utilized for the radio transmission.

The digital data is communicated to/from the CCU through the cable interface 275 which drives the signal across cabling to the CCU. Preferably each RF link contains two antennae which are operated at the frequency of operation or "channel" of a cordless handset. The channel utilized by each pair of antenna is communicated by the RF processor which causes a digital code identifying the channel to be used to be loaded into the phase lock loop circuitry of the RF link which controls the frequency of operation. Thus, each pair of antennae 215, 220, 225, 230, 235, 240 operates at a frequency of the cordless handset which it is currently communicating with. Two antennae are used for each RF link to provide a cordless telephone system with improved radio wave multipath transmission performance. Preferably the antenna used is that described in copending patent application U.S. patent application Ser. No. 07/607,451, entitled "Inverted U Antenna", filed concurrently herewith.

The radio transceiver circuitry contained in the RF link 250, 255, 260 receives the radio frequency signal from the antenna and extracts the data transmitted, in the present instance the digital voice data, and command information transmitted. Preferably radio transceivers employed are configured like those described in U.S. Pat. No. 4,759,078, titled "Coordinated Local Oscillator Receiving System", assigned to the Assignee of the present invention. Furthermore, to minimize the errors caused by noise, it is preferred that a data separator to determine the digital data, such as one described in copending U.S. patent application, Ser. No. 07/607,989, titled "Data Separator with Noise Tolerant Adaptive Threshold", be utilized. The control logic 270 receives the digital voice and control signals from the RF Links 250, 255, 260 and outputs the digital voice/control data to the cable interface 275 which drives the digital signals across a length of cable to the CCU. By separating the RF clusters from the central control unit, through a cable connection, the size of the RF clusters are small and therefore can be placed in stategic locations that improve the radio transmission performance. In particular, it is preferable that the RF clusters can be mounted on a wall at a predetermined height to gain better signal transmission performance. The CCU box then may be placed in a less obtrusive location.

Figure 4:
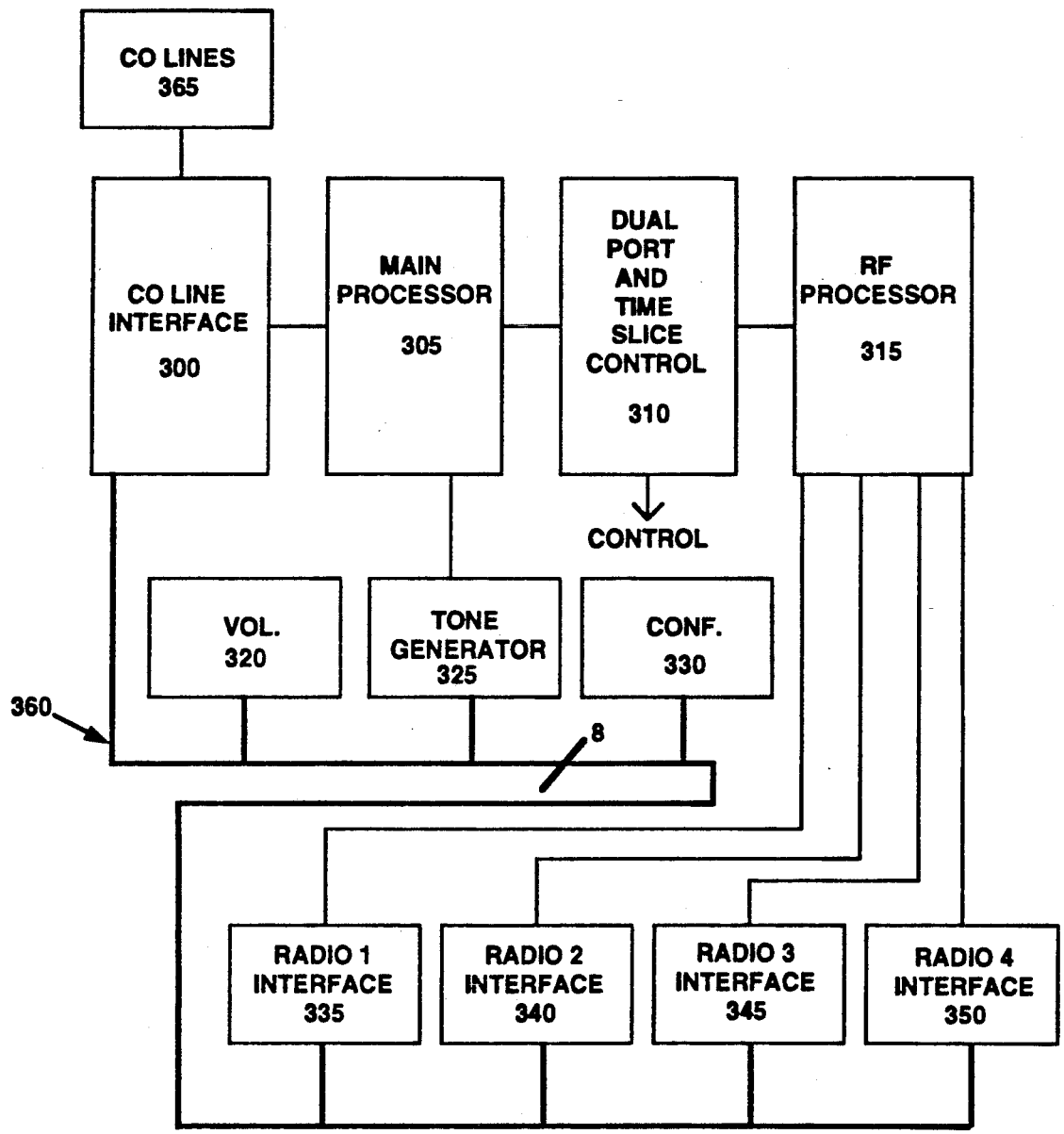
FIG. 4 is a block diagram representation of the central control unit of the telephone system of the present invention.

FIG. 4 is a block diagram representation of the central control unit (CCU) in the telephone system of the present invention. The CCU comprises a plurality of components, including CO Line Interface 300, main processor 305, dual port and time slice control 310, RF processor 315, volume control circuit 320, tone generator circuit 325, conference circuit 330 and radio interfaces 335, 340, 345, 350, one for each RF cluster connected to the system. The CCU components which interact with voice data are connected via the time slice bus 360, which permits the components to interface and operate with one another on a real time basis to provide a non-blocking telephone system.

The bus is controlled by the main processor 305 through the dual port and time slice control circuit 310. The main processor 305 further determines and tracks the connections and functions currently in use in the telephone system including the monitoring of keystrokes entered on the handsets by users, speed dialing, etc.

The CO line interface 300 connects the telephone system to telephone CO lines and insures that the voice signals are in the proper format to be received into the telephone system and signals received from a CO line are input to a CODEC located within the interface which translates the data from analog to digital. Once the data is translated into a digital format, it is acceptable for processing within the CCU. Similarly, if voice data is to be transmitted out through the CO lines, the digital signal received by the CO Line Interface 300 would translate the data from digital to analog signals and output those signals on the CO line 365.

The RF processor 315 interfaces with the radio interfaces 335, 340, 345, 350, each of which communicates with the RF cluster as illustrated in FIG. 3. The RF processor insures the integrity of the transmission channels, checking for errors and controlling the RF links to operate at the correct channels. A byte oriented protocol is used to check for proper start bits as well as proper parity. Additional checks are made for packet length and transfer time. In the event of any errors, the packet reception is aborted and the sending channel will resend. The RF processor routes the data packet to/from the various handsets/RF links as well as monitoring the activity received through the interface 335, 340, 345, 350 as to any initiated communications from the handsets as may happen when the user initiates a call or contacts another user on the system through the intercom.

Although the RF processor can control the allocation of channels to handset communications, it is preferred that the main processor perform channel allocation. For example, when a handset attempts to go into the communication mode (e.g., when the handset goes off hook), the RF processor notices that the handset went off hook and notifies the main processor which allocates a communication channel to the handset. The main processor then notifies the RF processor of the channel allocated and communicates the channel allocation to the handset through the broadcast channel the handset monitors. The RF processor then controls the appropriate RF link to adjust to the channel frequency indentified by the main processor. Each radio interface 335, 340, 345, 350 consists of an ASIC which contains the circuitry (UARTs) to communicate serial data to the RF clusters. UARTs in the radio interface ASIC functions similar to the UARTs located in the handset ASICs, e.g., the UART inserts/removes the command data and add/removes start, stop and parity, as well as checks for parity.

The volume control 320 adjusts the volume of the digital voice data according to input received from the user from the radio handset. Similarly the tone generator 325 generates the digital form of tones required to operate the systems such as the tones generated when the phone rings or when the keys are depressed to dial a number. The conference facility 330 provides an innovative and real time way of conferencing multiple handsets and calls received through the CO lines. The volume control, tone generator and conferencing facility will all be discussed subsequently.

Figure 5:
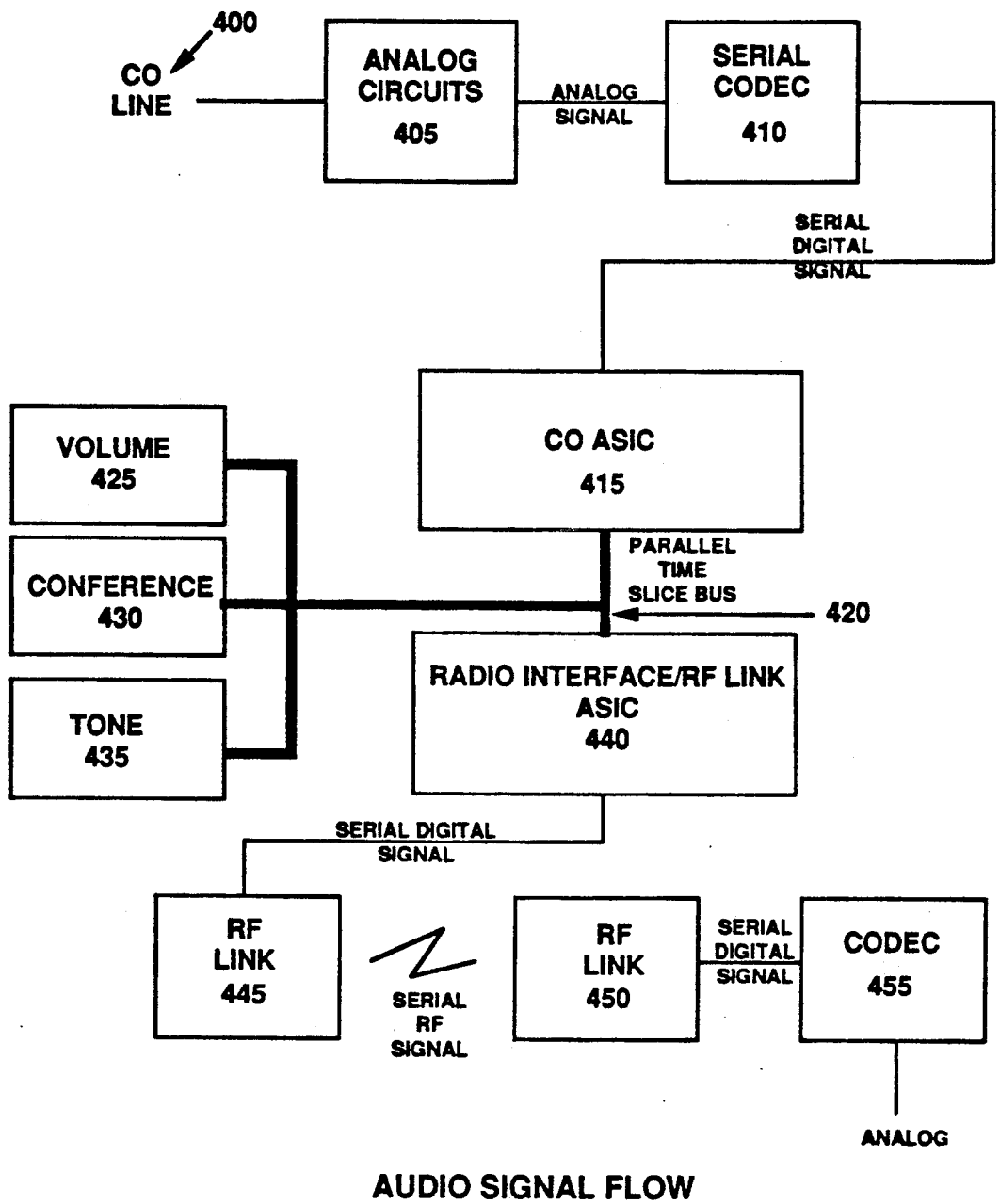
FIG. 5 illustrates the signal flow from a central office line to a radio handset in the telephone system of the present invention.

The signal flow of the voice data through the system may be understood by reference to FIG. 5, voice signals are received from external sources through the CO telephone line 400. The CO lines are the standard two line telephone system which complies with Part 68J of the FCC code and can also be connected to a PBX system. Each CO line attached to the system is connected to analog circuitry which provides surge protection for the CCU. The analog signal is then inputted to a CODEC 410 located in the CCU which translates the analog voice signal to digital. The analog to digital translation process performed by the CODEC is one that is routinely employed in the phone industry to connect analog phone signals to digital (and digital signals to analog) and contains a filter and rolloff of 3.5 Khz, with a sampling or frame rate of 125 microseconds (8 KHz). In telephone systems, the rate at which audio information is sampled, digitized and transmitted is referred to as the frame rate. The output of the CODEC 410 is an 8 bit digital value quantized using a companding technique (such as the $\mu$/law companding technique employed by the phone industry). This digital 8 bit representation of voice data is output in parallel by the CO ASIC 415 to time slice bus 420. The CO ASIC 415 comprises shift registers to buffer the serial data and output the data in parallel to the time slice bus 420 in a timely manner. The parallel time slice bus 420 is used to move data among the components connected to the bus, that is, radio interface/RF link ASIC 440, volume control circuit 425, conference control circuit 430, and tone control circuit 435.

Data received by radio interface/RF link ASIC 440 is translated from parallel digital format to serial digital format and transmitted to the radio link circuit 445 which then outputs the serial digital data as radio waves for reception by the handset. In the handset, RF link 450 receives the digital radio signal and inputs the digital data received to a CODEC 455 which translates the voice data into an analog signal for output to a speaker or other listening device. The signal path for a transmission initiated by the handset is the opposite of that just described wherein the voice signal, that is, the voice emitted by the user of the handset is input to the CODEC 455 which translates the analog voice signal to a serial digital signal for input to the RF link 450 which transmits the data across the radio waves to the RF link 445 of the CCU. Serial data received the RF link 445 is input to the radio link ASIC 440 which translates the digital data from serial format to parallel format for output on the time slice bus 420. The voice data is output to the CO line through the CO ASIC 415 which translates the parallel digital voice data to serial format for input to the CODEC 410. The CODEC 410 translates the serial digital signal to an analog signal for output to the CO line 400.

Figure 6:
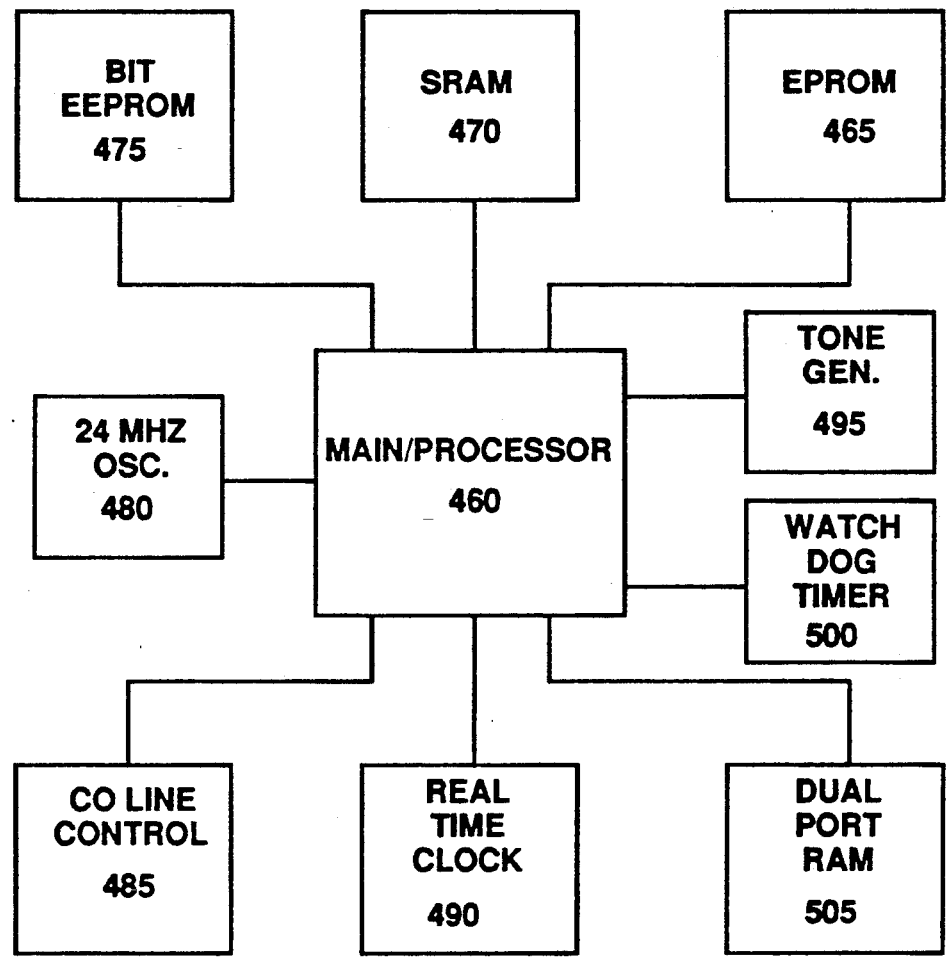
FIG. 6 illustrates the functionality of the main processor in the telephone system of the present invention.

FIG. 6 is illustrative of the functionality of the main processor. Preferably the main processor 460 is a 16 bit processor with an 8 bit external bus to communicate to the components attached to the processor 460. The main processor 460 controls the functionality of the central control unit and thus the telephone system, except for the actual control of the RF links which communicate with the cordless handsets, that being controlled by the input/output processor (described in FIG. 7). The code to operate the main processor 460 is stored in memory 465 for access by the main processor 460. Preferably the memory 465 is an EPROM. Additional memory (RAM) is used to store system information, including all temporary data as well as permanent data such as speed dial numbers which are utilized preferably by the users of the handsets 470. A non-volatile memory 475 is preferably used for storing handset serial numbers and manufacturing data.

The main processor 460 operates at 12 MHz and is driven by a 24 MHz oscillator 480. The main processor 460 also controls the interface to the CO lines 485. For example, the main processor will monitor ring detect or off-line status, and will perform what actions are required according to the status. For example, if a user picks up a handset and depresses a line key on the handset indicating that he wants a line to make a call, the key code will come back over the radio link to the RF processor where it is stored. The RF processor communicates that the information is available for retrieval. The main processor will then allocate the channel to the handset. The main processor accesses a real time clock which is used to provide date/time information to the system. This is utilized by the CCU as well as the handsets to provide time and date information to the user. The main processor communicates with the tone generator 495 to indicate the tones that are to be generated, the tone generator simulating touch tone ® (Touch tone is a registered trademark of AT&T) as well as other call progress tones that are transmitted to the handset and to the CO lines.

A watch dog timer 500 is connected to the main processor 460 to insure that the system does not break down or stall. Every period, (for example, every 1.6 seconds) the processor addresses a predetermined address. The sequence of addressing generates a hardware pulse which is detected by the watch dog timer. If the system does not generate that pulse within the time frame, the system is reset. The main processor 460 also controls a dual port RAM 505 which is used to control the operation of the time slice bus, as will be described below.

Figure 7:
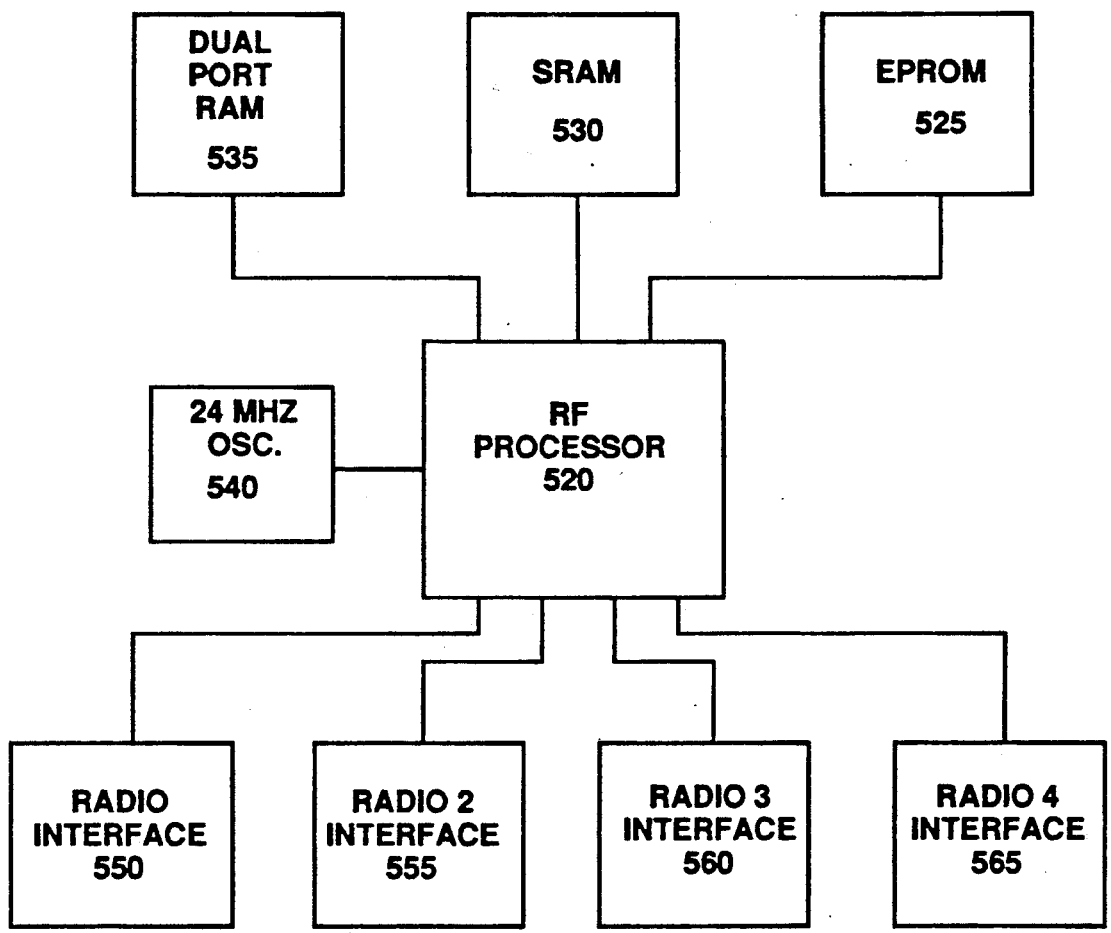
FIG. 7 is a block diagram illustrating the functionality of the RF processor utilized in the telephone system of the present invention.

FIG. 7 illustrates the functionality of the RF processor. The RF processor 520 is connected to memory 525, 530, 535 for access to the code which operates the processor 520, as well as the dual port RAM. The RF processor utilizes the dual port RAM to communicate with the main processor.

The RF processor 520 operates at 12 Mhz and is driven by the oscillator 540. The main function of the RF processor 520 is to control the RF link units interfaces 550, 555, 560, 565 which communicate with the cordless handsets. In particular, the RF processor 520 sends and receives commands from the RF ASIC and communicates the commands to the main processor and also does the channel control. For example if there is a channel where continuous errors occur, the RF processor will cause a new channel to be allocated. Furthermore, the RF processor 520 controls the transmission of the voice data as well as the transmission of command data. The RF processor also controls the transmission and receipt of command data between the central control unit and the handsets. The CCU controls the functionality of the handset through the command data transmitted to the handset. For example, the CCU may send the handset a command to update the LCD display on the handset. Similarly, the CCU may receive command information from the handset, for example a key press to dial out to a CO line or to conference with another telephone or handset. The RF processor will interpret the data received from the handset and determine the command that the handset is transmitting.

The radio transmission data structure is based on an 8 Khz frame, wherein the transmit and receive signals alternate on the half cycles of the 8 Khz frame. Both command and voice data must be bi-directionally transparent within a single frame. Since a large portion of time is spent moving the audio data, very little bandwidth is available to reliably transfer the commands and status over the same RF link transparently so as to not affect the quality of the voice transmissions. Secondary command channels could be used but would add considerable cost to the system. A secondary channel would have to be dedicated for each handset or a single channel with handset polling would be needed. Either alternative would use up valuable channels and resources. Instead, an innovative technique is employed which unobtrusively inserts the command data into the voice data to be transmitted on an as-needed basis.

Figure 8A:
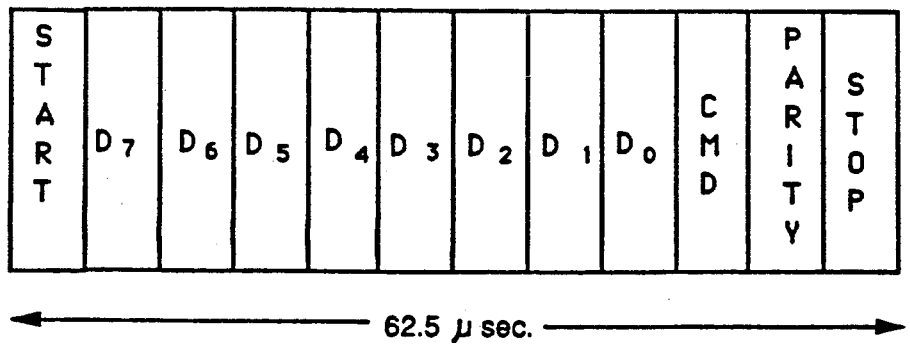
FIG. 8a illustrates the format of information communicated between radio transceivers.
Figure 8B:
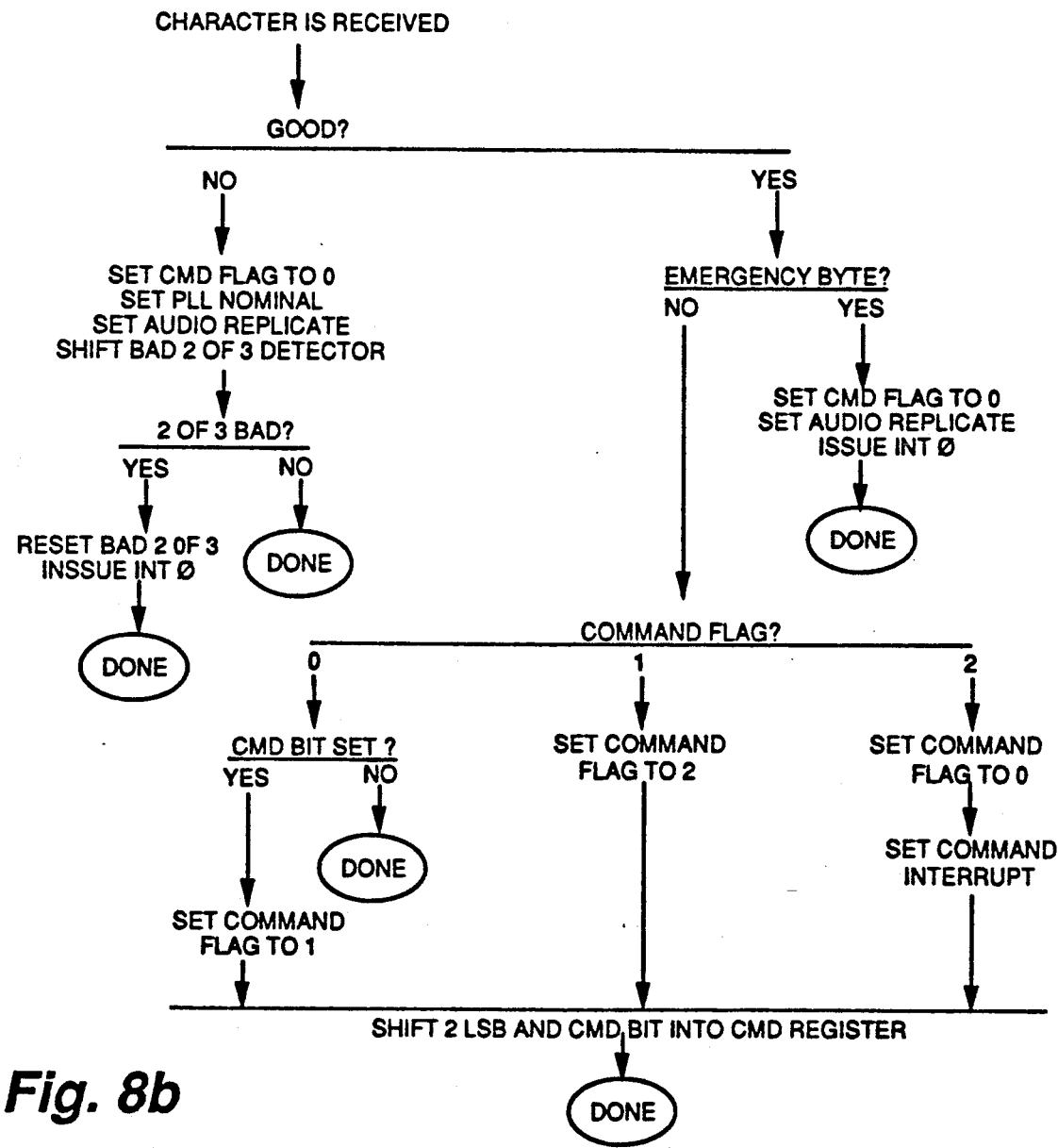
FIG. 8b illustrates the sequence to extract command information from the formatted data transmitted between the handset and the central control unit in the telephone system of the present invention.

Each data frame consists of a start bit, 8 data bits, 1 command bit, 1 parity bit, and a terminating stop bit. This is illustrated in FIG. 8a. The command bit is used to provide command information as well as additional command information to be formatted for transmitting command information between the devices is the same whether a command originates in the handset and is transmitted to the CCU or the command originates in the CCU and is transmitted to the handset. For example, a command may be sent by the CCU to the handset to enable or disable the audio on the handset. A command may be initiated by the handset to respond to a status poll issued by the CCU. As is seen from FIG. 8a, and with reference to FIG. 8b, an exemplary process with respect to the receipt of data from the CCU by the handset is illustrated.

When voice data is received, it is received through the antenna into the UART which first determines if the character is a valid character. If it is not a valid character, the transmission is ignored. If the character received is valid, the character's value is examined to determine if an emergency byte has been sent. An emergency byte is a packet transmission of a single byte which is recognized (a typical packet is approximately 10-15 bytes long) to be a request by the handset for help. For example a handset may send an emergency byte when the errors are numerous on communications through a specific channel or antenna and communications are difficult. An error or an emergency byte will trash any partially received command packet. This information is not passed on to the handset processor. If data representative of a valid channel is received, the data is made available to the handset processor.

The handset processor then checks to see if the command bit has been set. The command bit is the bit adjacent to the last data bit. If the command bit is set, the system performs two things: (1) shifts the two least significant bits of the voice data ($D_0, D_1$) into a register identified as the command register for temporary storage; and (2) sets a command flag in the system to indicate that the next two bytes received from the CCU contain command information. The additional command information is located in the two least significant bits of the voice data and the command bit.

When the next byte of information is received, the two least significant bits, as well as the command bit, are extracted and inserted into the command register adjacent to the two least significant bits previously extracted from the prior byte of information. This process is performed a third time wherein the two least significant bits of the voice data transmitted as well as the command bit are moved into the command register. The command flag is then reset and an interrupt is generated to notify the handset processor that a command byte is waiting. The handset processor can then read the command register and perform the necessary functions in response to the command. By utilizing this technique, command information can be transmitted over radio links concurrent with voice data with little or no effect on the quality of sounds heard by the listener. In addition, the quality of the voice sounds transmitted is maintained by utilizing a portion of the voice data to transmit command information only when it is necessary to transmit command data. When there is no need to transmit command data, the voice data transmitted comprises the full 8 bits of voice data.

The telephone system of the present invention further provides for the synchronization of the cordless handsets to the CCU. Although the handsets may operate according to clocks set to the same frequency, there is no guarantee, and in fact frequently, the situation arises that the handsets will be out of phase with the CCU. If the handsets are operating out of phase with the clock of the CCU, data transmissions will be lost to data overrun or data underrun and noisy or unintelligible noise communications result. Data overrun occurs when the handset drifts ahead of the CCU clock until the handset is out of phase with the CCU and it skips the receipt of a byte of data. Underrun occurs when the handset drifts ahead of the CCU in transmitting data such that the handset runs out of data to send.

Using the synchronization mechanism all the cordless handsets are synchronized to the CCU and to each other. This is achieved utilizing the 8 KHz frame employed by the CCU. The CCU is programmed to initiate transmission at a predetermined time during the frame. Preferably the CCU begins transmissions at the beginning of the frame. Thus the handsets can utilize as a time reference the initiation of a transmission from the CCU to synchronize the handset to the CCU. The handset includes a digital phase lock loop circuit constructed of a local oscillator, a counter operating at 1.536 MHz (to comply with the CODEC specifications) and a phase delay circuit.

When the handset receives data from the CCU, the validity of the received data is determined by checking the parity and length of the data received. If the received data is not valid or no data is received, the phase delay circuit will reset the counter when the count reaches 192 (1.536 MHz/192=8 KHz frame rate) to maintain the current frame rate. If the synchronization control bit in the handset is set, the counter will be reset by the phase delay circuit at the time reference, e.g. the leading edge of the received data, thereby synchronizing the handset to the CCU. If the received data is valid, and the control bit is not set, the phase delay circuit checks for the time reference when the counter is at a value of 191, 192 and 193. If at count 191, the time reference has already arrived from the CCU, the phase delay circuit will reset the counter thus "pulling" the local frame reference (the counter at count 192) closer to the CCU time reference. If the time reference arrives between counts 191 and 192, the counter reset will occur at count 192. If the counter reaches 193 and the time reference has not arrived, the counter is reset regardless of the location of the time reference thereby "pushing out" the local frame reference towards the CCU frame reference.

In practice, it is desirable that the synchronization between the CCU and handset is established by setting the synchronzation control bit to immediately synchronize the handset local frame reference to the CCU frame, and thereafter adjusting, as needed, the frame reference at each frame. Once the initial phase lock is accomplished to synchronize the handset to the CCU, the primary cause of drift is the difference in the crystal tolerances in the handsets and CCU (ignoring hardware failures or power losses), and the phase lock loop circuit in the handset insures that the handset and CCU do not drift far apart.

The time slice bus architecture of the present invention located on the CCU permits the routing and manipulation of voice and command data in a timely fashion to provide a non-blocking telephone system consisting of cordless handsets that operates in a real time manner and includes the full functionality of corded telephone systems.

Figure 9:
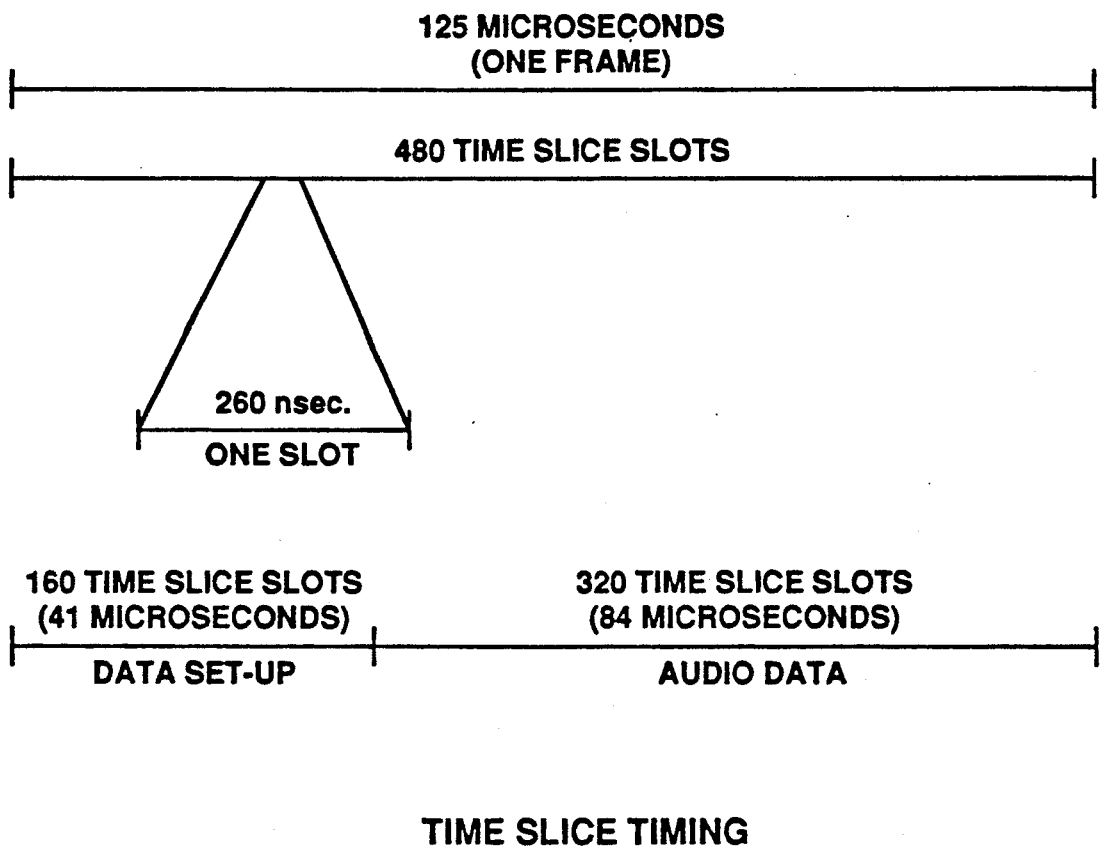
FIG. 9 illustrates the time slice timing of the time slice bus in the telephone system of the present invention.

The time slice bus of the present invention provides the means for operating the system in a real time manner. The bus operation consists of 480 slots per frame at 260 nanoseconds per time slot and thus the duration of each clock pulse is 125 microseconds. This amount of time is referred to as a frame. As illustrated in FIG. 9, a frame is divided up into 480 time slice slots. Each slot is 260 nanoseconds. Within each slot, information, preferably one byte, can be transferred between a source device and destination device connected to the bus. At the beginning of a slot of voice data, the source device identified for that slot drives the data to be transmitted onto the bus and at the end of the slot the destination device latches the data off the bus. Therefore, up to 480 data transfers, that is, 480 bytes of information, can occur within one frame. By having 480 time slice slots, it is reasonable to provide a system such as the 12 handset 12 RF link system described which can accommodate almost any configuration at any level of complexity in its operation, such that each device connected to the system can communicate with any other device during a particular frame. Thus, the system is considered a non-blocking system, because any one device, e.g. handset, is not prevented from operating due to the lack of available resources.

Furthermore, the system does not experience delays due to the unavailability of bus time for transmitting data between devices. In the present embodiment described herein (FIG. 2), it has been determined that a maximum of 320 time slice slots is required to transfer data to service the devices of the telephone system when operating at its maximum or "worst case" condition. Thus, it is preferred that the time slice bus is allocated such that 320 time slice slots are used to transmit audio data and the remaining 160 time slots are used for such things as command transfer or miscellaneous data initializations and the like. Preferably a portion of the 160 time slots is used for the bidirectional transmission of command information between the RF processor and the main processor of the system. In addition, the time during the first 160 time slice slots may be utilized by all devices that received data during the prior frame to move the data out of the latch and into the device for processing such that the latch is cleared, and by the source device of the present frame to move the data to be transmitted into the source register attached to the bus, so at the time slot required the data is simply driven from the source register onto the bus for transfer to the destination device. Thus by utilizing the available time during the first 160 time slots, both the source and destination registers attach to the bus during a stable state of time of the audio data transfer and errors are avoided. As will be apparent to one skilled in the art, the system can be adjusted to provide additional slots for the movement of voice data or additional slots for other functions depending upon the particular system configuration.

Figure 10:
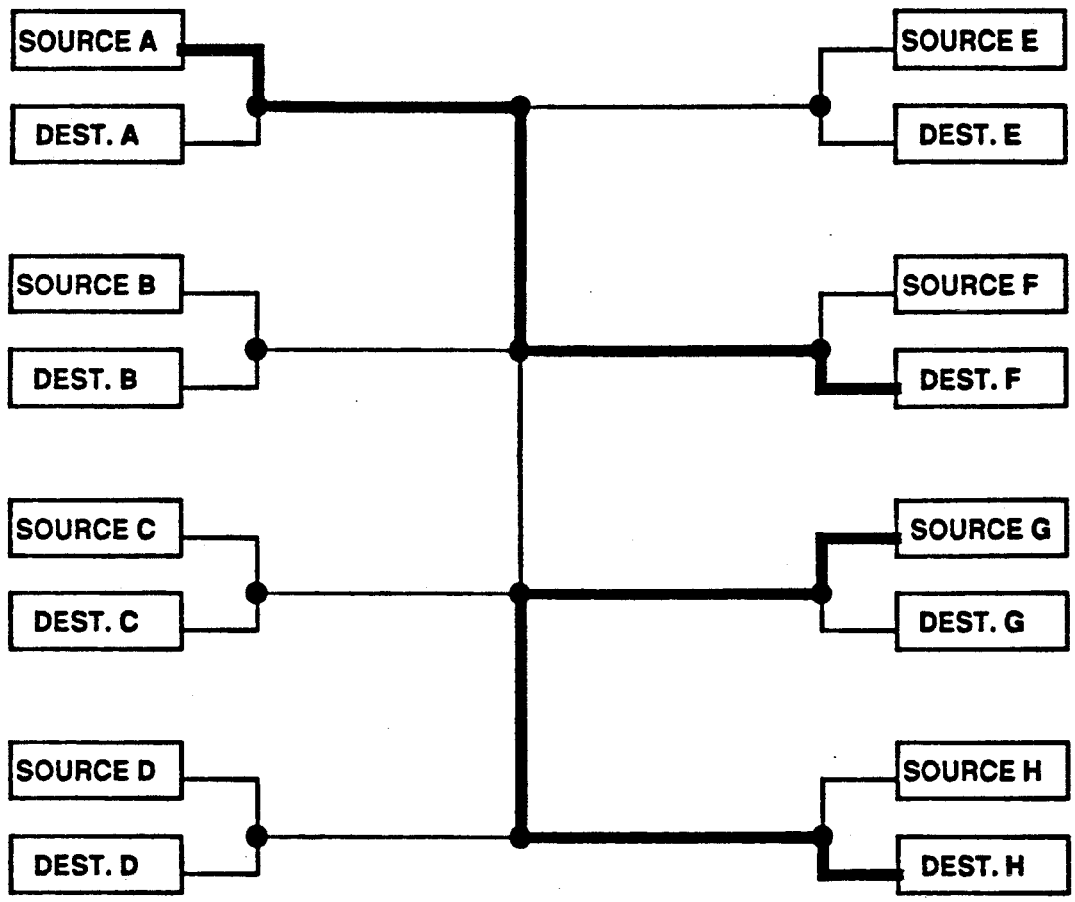
FIG. 10 illustrates the use of the time slice bus in the telephone system of the present invention.

FIG. 10 illustrates some basic data transfer that may be made during a frame. For example, in the first time slice slot information may be transferred from Device A to Device F, and in the second time slice slot information may be transferred between Device G and Device H. For ease of programming and simplicity in the system, it is preferred that each source destination combination be allocated a predetermined time slot for use. This simplifies the programming of the system as well as the signal connections. If a particular source destination pair is currently not in use, then the time slice slot then would essentially be idle during the slot. The system has been designed to be a non-blocking system and with no less in system performance because each possible source/destination pair is allocated a predetermined time slot and the idle slots can be accommodated and still operate within a single frame.

Within each device there may be different portions of the device that output different data. This is especially true if the device provides multiple functionality or provides direct memory access into different tables. To accommodate this a second time slice bus parameter referred to as attributes is utilized. An illustration of source attributes and destination attributes are illustrated in FIG. 11. For example, a source may be the central office lines and the attribute may identify the particular central office line, e.g., central office line 1, central office line 2, central office line 3 or central office line 4. A destination may be the volume circuit, which will be discussed subsequently herein, and an attribute may be transmitted to identify the volume table to be referenced which corresponds to the amount of volume increase or decrease to be made to the voice signal received from the source central office line. Therefore, the attributes convey additional information as to the destination within a particular device and thus the processing of the data by the destination device.

Figure 12:
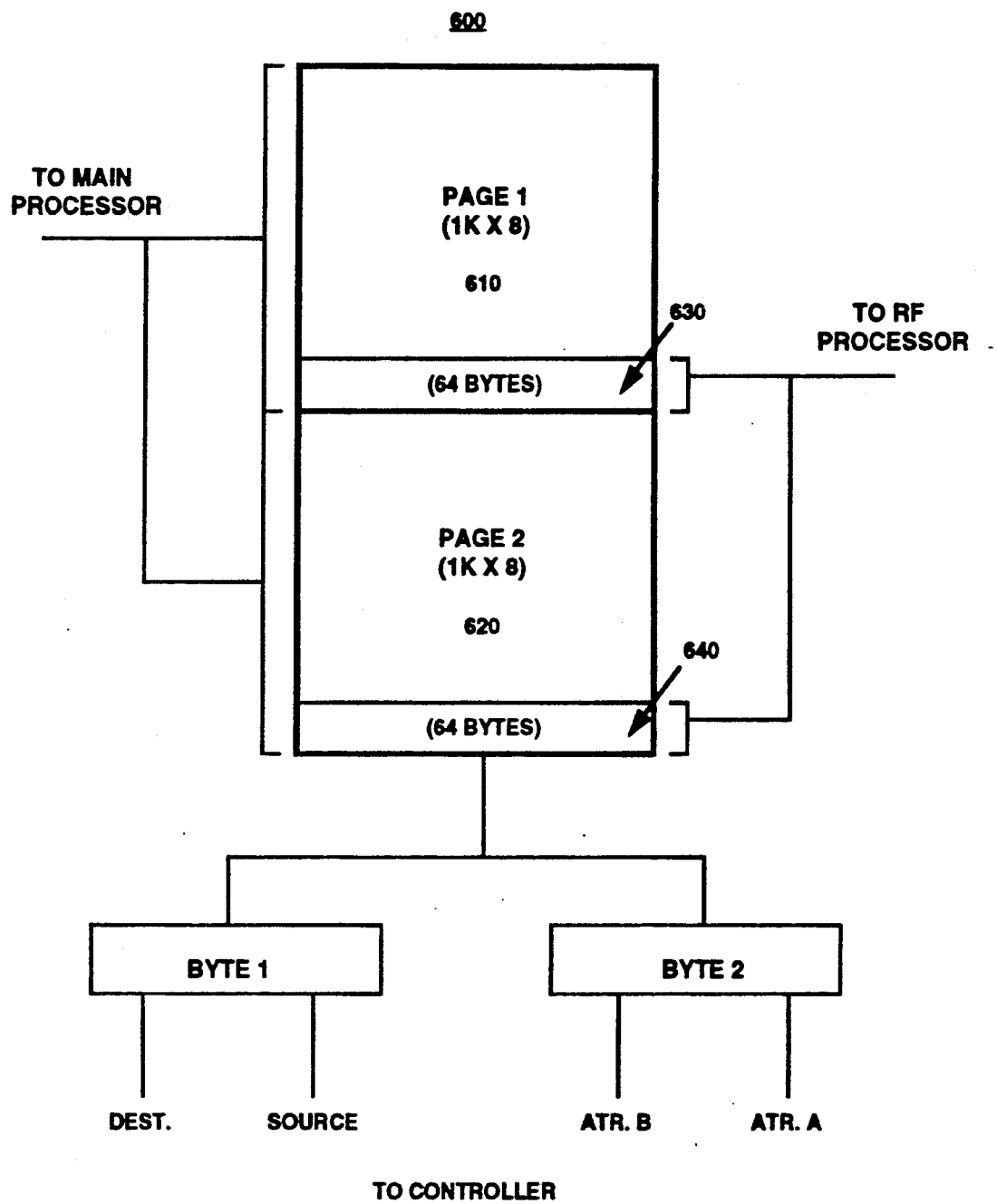
FIG. 12 is a block diagram representation of the dual port RAM utilized to control the time slice bus of the present invention.

The source/destination pairs identifying the utilization of the time slice bus is set forth in a dual port RAM (505 FIG.6). Referring to FIG. 12, a dual port RAM memory 600 is divided into two regions of pages 610, 620. The first page 620 is located at the lower address of the RAM and the second page 610 is located at a higher address of RAM. Two pages are utilized to enable the configuration of the bus to be updated on a real time basis as needed to reflect new connections and data transfers to be made. Thus the bus configuration can be modified without affecting the synchronization and timing of the time slice bus. While one page is being referenced by the bus controller to provide the proper bus addressing information (source/destination addresses), the second page is being accessed by the main processor to change the information in the memory to be updated in the next frame. If data is changed in the memory to indicate for example, a new connection that is made between a central office line and a handset, the main processor will set a flag which tells the bus controller to reference the other page in memory for time slice bus information. This is switched at the end of the frame with no effect on the timing of synchronization of bus operations. Thereafter, the bus controller will access the new frame and the main processor will write to the memory to update the configuration at the page no longer being accessed by the bus controller.

Thus, the main processor can therefore update the time slice bus independently of and in parallel with current bus operations without affecting the current data movement and operations, and, at the end of a frame when the main processor is ready to do so, quickly switch to reference the other page wherein the data transfer to be performed during the next frame is modified and updated. This permits rapid data movement among devices and excellent performance if the telephone system including (as will be discussed later) conferencing, tone generation and volume control. Without this technique, the amount of data and information to be transferred over the bus would take more than one frame and the user would thus experience this system degradation in utilizing the system. Furthermore, the likelihood of erroneous bus connections due to the main processor failing to update the bus connections quickly enough is eliminated. This technique insures that the a valid source/destination page of dual part memory is available before switching to that page. In addition, noise generated by on-the-fly connections is avoided.

Figure 13B:
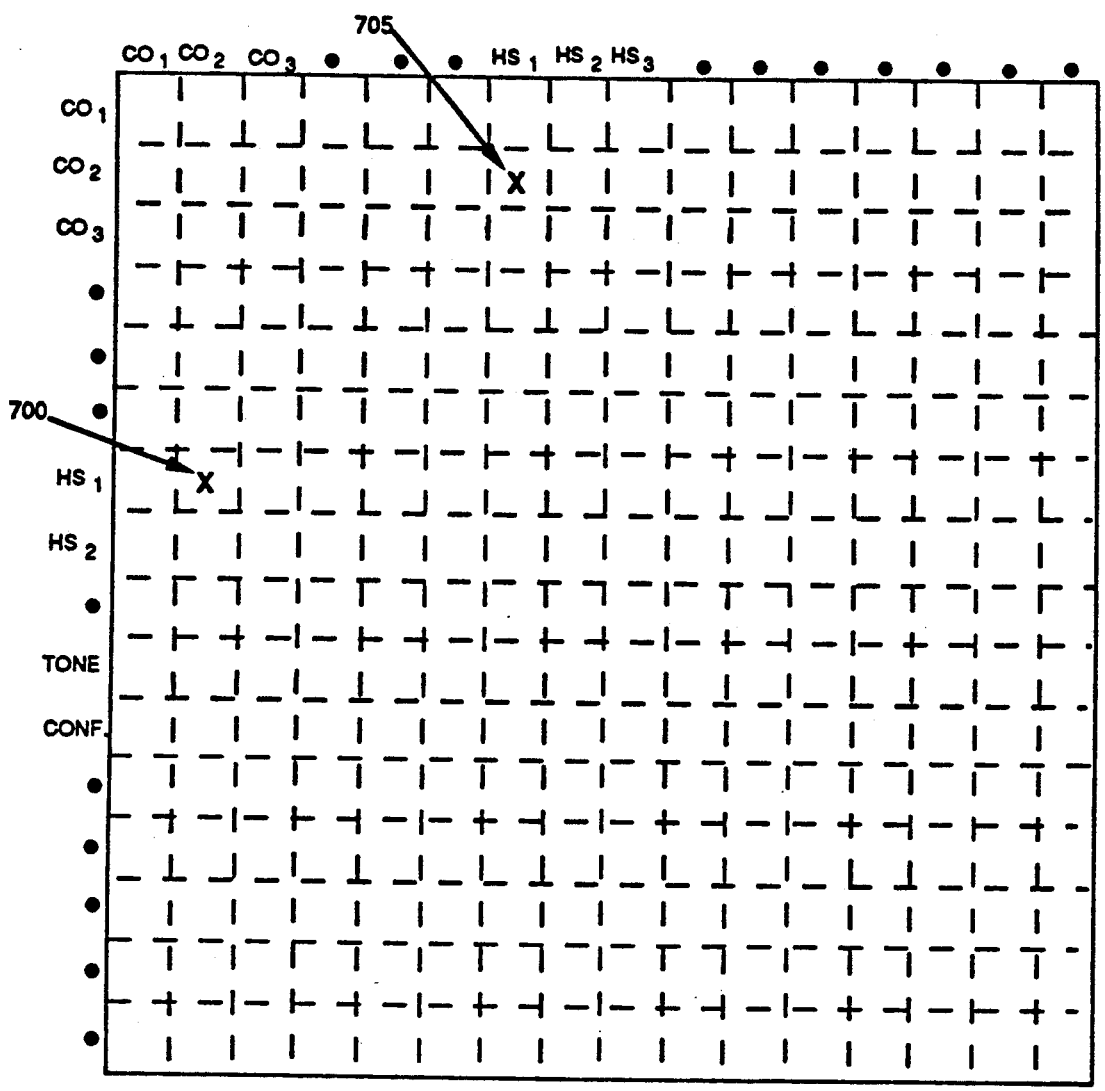
FIG. 13b illustrates the table used to track the current system configuration in the telephone system of the present invention.
Figure 13A:
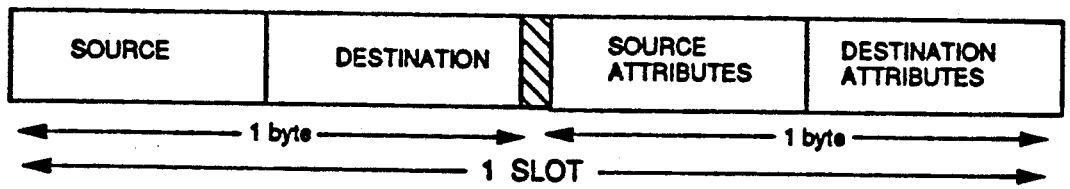
FIG. 13a illustrates the data read from the dual port RAM for each time slot of the frame.

The information stored in the dual port RAM is the source and destination addresses and attributes for each time slice slot. Preferably the information for each time slot is stored in a sequential manner according to the sequencing of time slots such that there is a simple, linear addressing relationship between the number time slot and the address of the time slot information stored in the dual port RAM. As will be discussed subsequently, this permits the bus controller to utilize a simple addressing scheme for accessing the dual port memory during the operation of the time slice bus. This information is contained in two adjacent bytes as shown in FIG. 13a. The source and destination addresses are placed into the first byte and the source and destination attributes addresses are put into the second byte, each utilizing 4 bits. Thus the first byte read from the dual port RAM 600 contains the destination and source address followed by the second byte containing the attribute information for the source and destination devices.

The dual port RAM is also utilized to provide the means for the RF processor and the main processor to communicate information to one another. As discussed previously, the RF processor controls the radio devices that communicate with the handset. If, for example, a user picks up a handset to make a telephone call, the RF processor observes that the user has picked up the handset and would communicate to the main processor that the handset, for example handset 1, needs to be connected to a central office line. The main processor will take that information and update the dual port RAM to make the corresponding source/destination device connections through the time slice bus. The RF processor communicates this information to the main processor through a special area of dual port RAM pre-defined by the system and a flag is set to notify the main processor that data/information has been placed by the RF processor in the dual port RAM. The area of the dual port RAM utilized for RF processor/main processor communications is not accessed by the bus controller and the main processor does not write into that area for any other purpose aside from communicating with the RF processor. Similarly, to communicate with the RF processor, the main processor would write the information to be communicated into the memory at the predetermined location and set a flag to notify the RF processor that there is information awaiting in the dual port RAM memory.

Preferably, as illustrated in FIG. 12, there exists two regions of memory for main processor/RF processor communications. Although the two regions 630, 640 may be utilized in almost any contiguous/noncontiguous manner, it is preferred that the first memory portion 630 may be used by the main processor to communicate with the RF processor and the second portion of memory 640 may be used for the RF processor to communicate to the main processor. It should be noted that alternatively, main processor and RF processor communications can be implemented by providing a separate FIFO buffer which is accessed by the processors for writing and reading command data/information.

Preferably, the dual port RAM memory in each page is configured such that a predetermined address corresponds to a predetermined time slice slot. This is illustrated in FIG. 14. Slot 200 connects Central Office Line 2 to the third table of the volume circuit. Slot 201 is to communicate data from the volume circuit to the handset connected via a first radio link in the first RF link circuit of the radio interface. Slot 202 is to connect the handset to the fourth volume table and slot 203 is to transmit information from the volume table to the central office line 1. These four slots provide the communication of data which furnishes the function of connecting central office line 1 to the handset at the first radio link of the RF link circuit, in which the voice signal coming in through the CO line is adjusted according to volume table three and the voice signal coming from the handset to be output to the CO line is adjusted by a value located in volume table four. Thus, the dual port RAM contains the following information, as illustrated in FIG. 14. At location 400 the source byte CO line 650 is transmitted followed by the adjacent byte identifying the volume table 660 as the destination device for slot 200. The next byte 401 contains the attributes for the source device, that is, that the central office line is CO line 1 665, and the attributes for the destination device 670, that is, the volume table to be accessed is volume table 3. Although, the source/destination addresses and attributes may be dynamically allocated to slot locations as needed, it is preferred that predetermined address locations are used to address the slots in predetermined sequence, thereby rendering the slot addressing process is simple and sequential and as is described subsequently, the addressing means can be a simple counter.

To keep track of the connections and information being transmitted, the main processor maintains a status of the telephone system in random access memory. FIG. 13b shows an exemplary table of the devices connected to the time slice bus in the system wherein each possible source device is allocated a location on the y axis and each possible destination device is allocated a location of the x axis. The marked locations 700, 705 indicate that a connection is made between the handset and a central office line. More particularly, 700 indicates that the handset is communicating to the central office line 2 and 705 indicates that the central office line 2 is communicating with handset 1. The main processor refers to this table of information to determine what information to write into the dual port RAM. When the main processor receives information as to, for example a user picking up a handset to make a call, the main processor will update this matrix and correspondingly update the dual port RAM to provide the necessary connections. Preferably the main processor updates the dual port RAM by reading and translating the matrix information to update the entire page. Alternatively, the main processor may selectively update the dual port RAM according to the connections made or removed.

Figure 15:
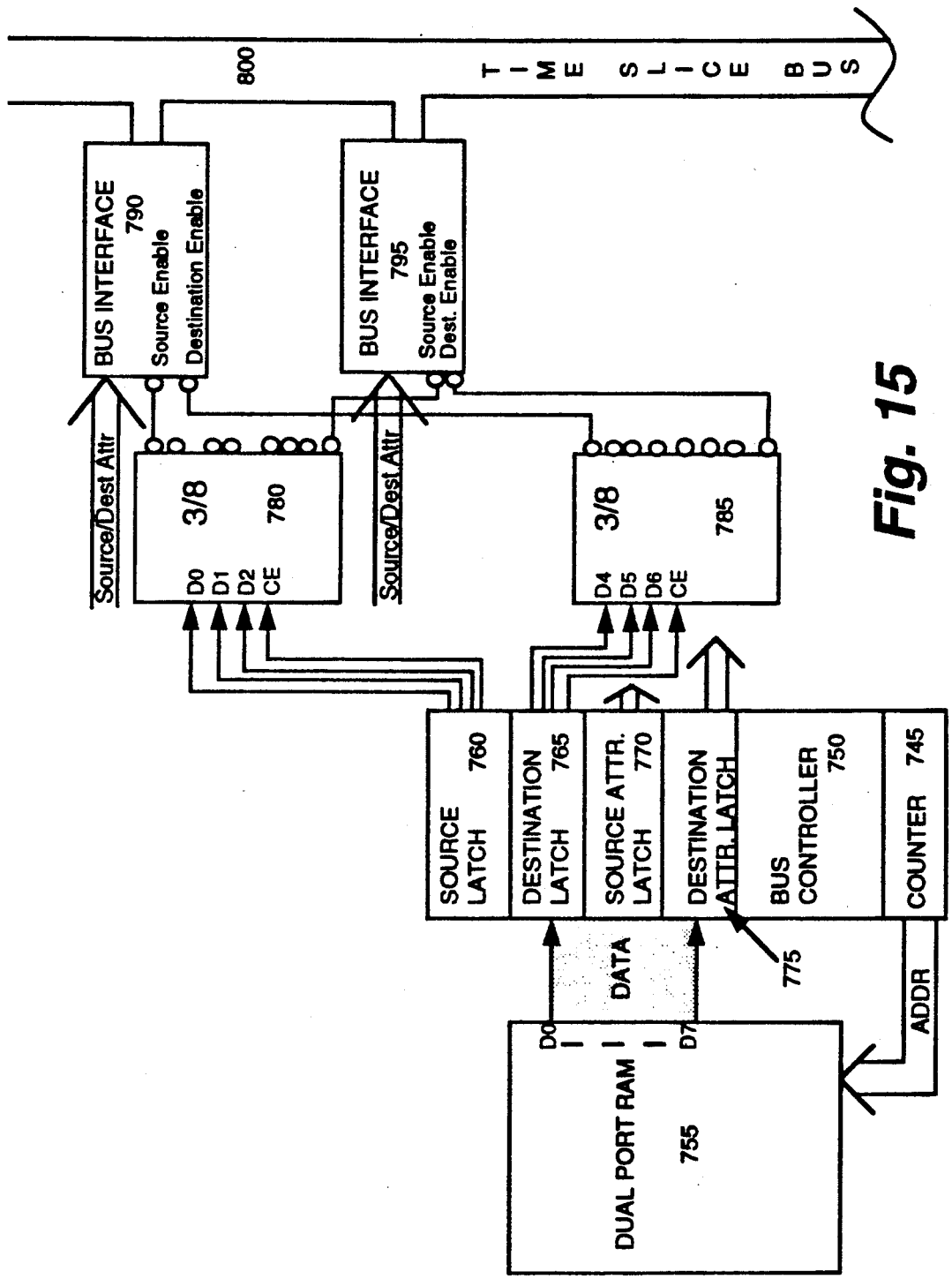
FIG. 15 illustrates the control circuitry used to select source and destination devices in each time slice slot in the telephone system of the present invention.

FIG. 15 is a block diagram representation of the signal flow from the dual port RAM to the source and destination devices which operate on the time slice bus. The bus is controlled by the bus controller 750 which reads the data output from the dual port RAM 755 and routes the information to the appropriate device. In particular, the bus controller includes a counter 745, source latch 760, destination latch 765, source attribute latch 770 and destination attribute latch 775. The counter 745 is preferably a ten bit counter which generates the address used to read data from the dual port RAM. Thus the counter will increment from address to address and at each increment an address will be read and output to dual port RAM 755. Because the time slice slot information is stored sequentially in the dual port RAM memory, each increment addresses the source/destination information for each incremental time slot. At the end of each frame which corresponds to a specific count (e.g. 480 corresponding to the 480 time slots), the counter 745 resets itself for re-execution and counting at the beginning of the next frame.

As described previously, the first byte out of the two byte pair read from the dual port RAM contains the source information and destination information. The first four bits are latched by the source latch 760 and the second four bits are latched by the destination latch 765. The next byte output is the attribute information in which the first four bits contain the source attribute information, which is latched by source attribute latch 770, and the second four bits are the destination attribute information latched by destination attribute latch 775. This information is latched into the bus controller to ensure that the information is available during the slot for subsequent transfer to the other control devices for enabling the source and destination devices.

Once the source attribute and destination attribute information has been latched, the source latch address information, the destination latch information, source attribute latch information and destination attribute information are respectively output from the latches 760, 765, 770 and 775 to be processed to enable the corresponding source/destination devices for the time slot. The four bits indicative of the address of the source device is input to a 3 to 8 decoder 780 (the fourth bit is used as a chip enable to activate the decoder). From this decoder one of eight output chip enable lines will go low and the corresponding bus interface for the selected device will be activated. At the same time the source and destination attribute information are output from the latches 770, 775 and transmitted to the bus interfaces 790, 795. Thus, for example, if bus interface 790 is enabled by three out of eight decoder 780 to be the source device and bus interface 795 is selected to be the destination device by three out of 8 decoder 785, then bus interface 790 will receive source attribute information and bus 795 will receive destination attribute information. Bus interfaces 790 and 795 are connected (not shown) to their corresponding devices.

The selected source device will move the data to be transmitted to the destination device into a source register such that the data is ready to be transferred onto the bus. At the beginning of the next slot the bus interface of the source device drives the data located in the source register onto the bus. At the end of the time slot, the destination device 795 latches the information on the bus and places it into a register for subsequent use in processing.

While the bus interface 790 and bus interface 795 are acting as source and destination devices for transferring data on the time slice bus 800 for a particular time slot, the bus controller 750 is reading the next two bytes in the dual port RAM 755 to pre-fetch the addresses for the source and destination registers for the next time slot. Thus with little overhead that affects the voice quality of this system, information can be quickly transferred between devices. The time slice bus of the present invention provides a simple innovative way of routing voice data among the different components of the system in a non-blocking, real time manner with the minimum of distortion using a simple configuration of hardware to operate the bus. Furthermore, the time slice bus provides the means for simple volume, conference and tone circuits to be implemented and operated in a real time manner.

Figure 16:
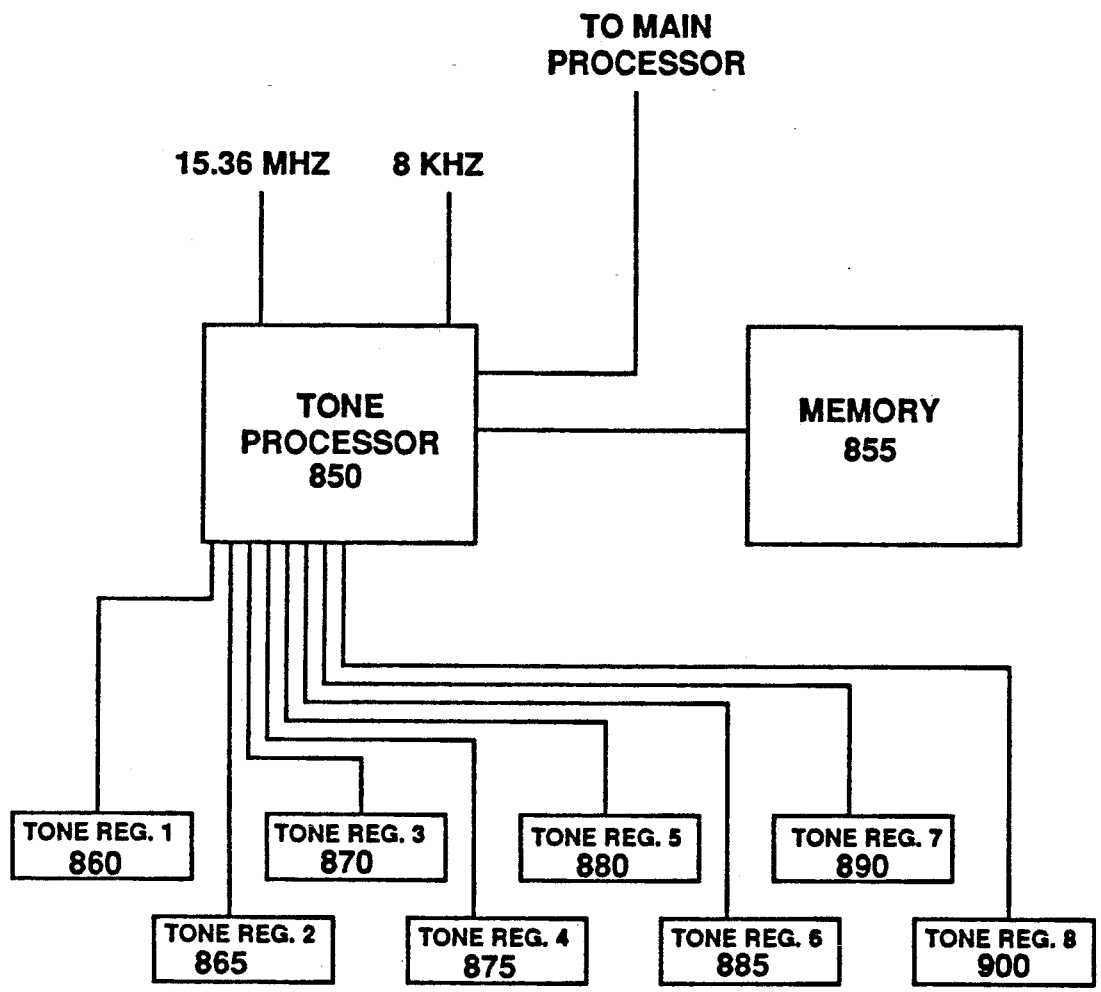
FIG. 16 is a block diagram representation of the tone processing circuit in the telephone system of the present invention.

Referring to FIG. 16, the tone generator for the telephone system of the present invention is described. The system is a pure digital system and the tones are accordingly digitally generated for the users of the system. The tone generator comprises a tone processor 850, memory 855 and registers 860, 865, 870, 875, 880, 885, 890 and 900. The memory 855 stores the digital values corresponding to various tones that may be utilized during operation of the telephone system. For example, the tones include those to simulate the touch tone, as well as call progress tones to notify the user of the status of the system (e.g., a call is waiting to be answered). The tone processor controls the generation of the tones and sequence of the tones by reading the memory 855 continuing tone data and outputing 8 bytes of memory to the tone registers 860–900.

Each register stores one byte of information which can be output to the bus during a time slice slot whereby eight bytes of tone data can be output during a single frame. Eight tone registers are utilized to provide up to the generation of eight simultaneous tones for servicing the cordless handsets. At the receipt of an interrupt from the main processor indicating that a tone needs to be generated, the tone processor 850 will retrieve from memory the first byte of the tone to be generated. This is output to the tone register, and at the corresponding time slot, the data stored in the tone register is driven onto the bus to the destination register identified by the main processor through the time slice bus architecture. If more than one device requires tone generation, then subsequent tone registers are utilized and the tone generation with respect to each device is interweaved among the eight registers 860 to 900.

While the tone information is being placed onto the bus, the processor 850 reads the next byte of information to be stored to the register thus providing a continuous sequence of data to be output as a series of tones. It has been found that this configuration can provide up to eight different tone sequences simultaneously with no degradation in operation apparent to the user. The tone generator is inexpensive in construction (requiring only a small processor, memory and registers) and flexible whereby any conceivable tone or sound, including voice sounds, can be easily generated simply by storing the tone data in the tone generator memory and accessing the data in a specified sequence to generate the desired tones as sounds.

Figure 17:
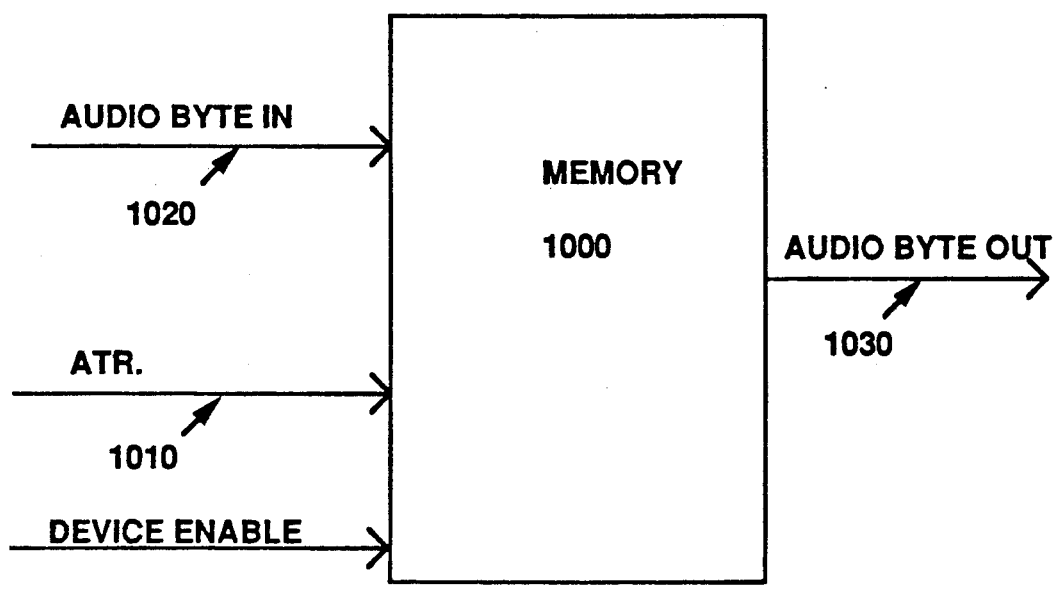
FIG. 17 is a block diagram illustration of the volume control circuit utilized in the telephone system of the present invention.

The volume circuit is described in reference to FIG. 17, and simply comprises a memory comprising a series of look-up tables, each table corresponding to a different volume setting. The table to be accessed is indicated by the attribute 1010 input into the memory 1000 and the audio byte input 1020 is used along with the attribute to index the proper table to get the audio byte output 1030 which is simply the data stored at the position indexed by the audio byte and the attribute 1010. Inasmuch as the audio data is in digital form and can only be a predetermined number of quantized values, the possible values of audio as modified by a predetermined volume can be pre-generated and stored in a memory for easy access.

The formula for determining the information to be stored in the volume tables is as follows:

if x = the number of dB of gain (or, if negative, loss), then the following steps were used to determine the output digital byte:

$$\text{output\_byte} = \text{COMPRESS}\ \{[\text{EXPAND}\ (<\text{input\_byte}>)*[10**(x/20)]\}$$

where the function COMPRESS takes a linear voltage as its input and converts it to 8 bit $\mu$-law PCM, while the function EXPAND converts an 8 bit $\mu$-law PCM byte to a linear voltage. COMPRESS and EXPAND are symmetrical such that:

byte = COMPRESS [EXPAND (byte)] and
voltage = EXPAND [COMPRESS (voltage)]

Each volume level "x" is a table in the memory for which there are 256 entries, one for each possible PCM (COMPRESSED) byte.

Figure 18:
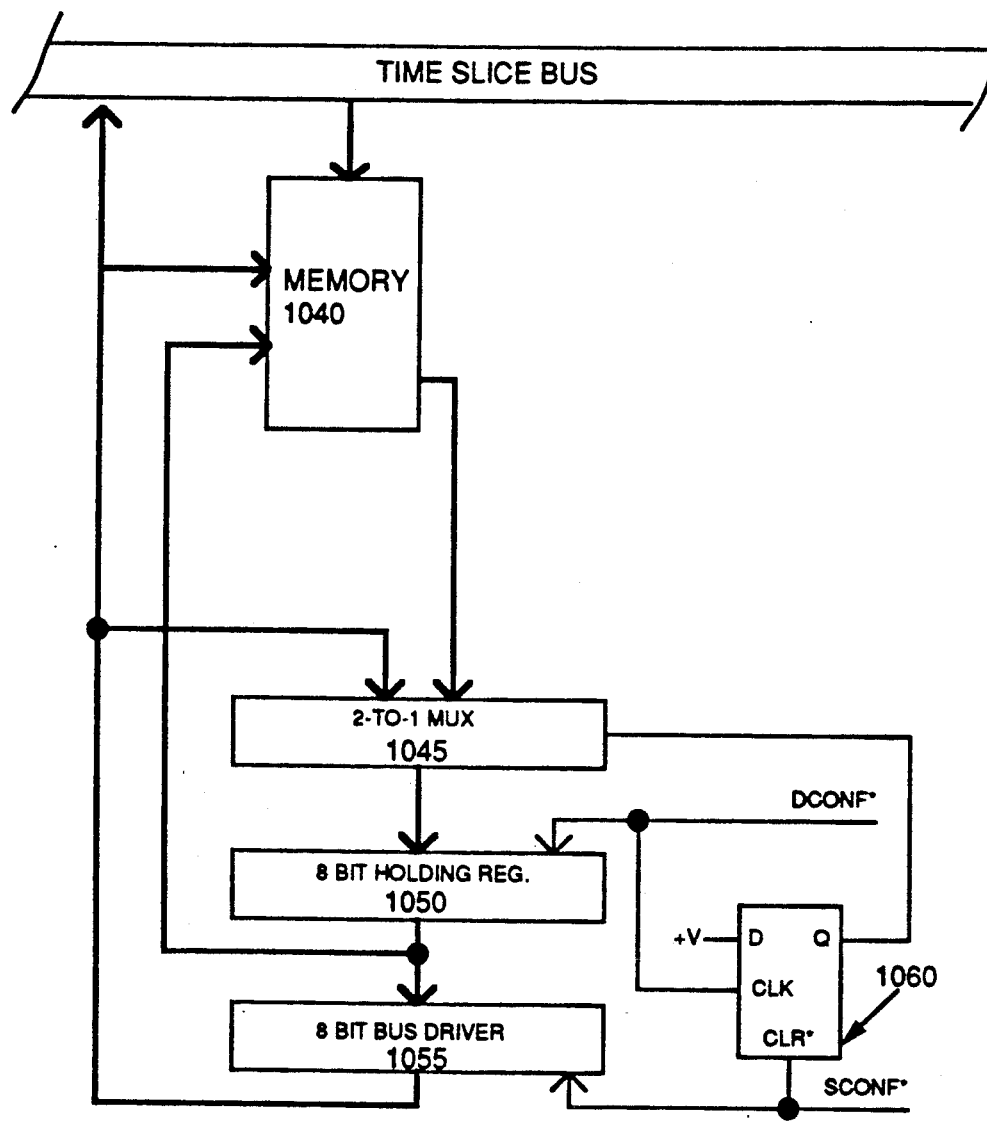
FIG. 18 is a block diagram illustration of the conferencing circuit utilized in the telephone system of the present invention.

FIG. 18 is a block diagram representation of the conferencing circuit of the telephone system of the present invention. The function of a conferencing circuit is to provide to a listener or participant of a conference the voice information or voice signals of the other participants to the conference. The present invention provides a conference circuit which can generate the necessary voice signals in a real time manner with no degradation or delay recognizable to the user. The conference circuit comprises a memory 1040, a multiplexor 1045, a holding register 1050, a bus driver 1055 and a D flip-flop or latch 1060. The memory 1040 stores a plurality of look-up tables containing pre-computed values for possible combinations of voice data.

As with the volume circuit, a simple look up table is permissible because the system is manipulating PCM digital data having a predetermined number of possible quantized values, which limits the number of possibilities and combinations (and therefore the size of memory required). The system operates to accommodate any number of users as participants to a conference with no degradation in system operation or voice signal quality. The system can accommodate any number of conference participants because the system incrementally adds the digital voice data representing each participant in an interactive (loop) manner utilizing a sequence of slots on the time slice bus to transfer data from the conference circuit to the participant devices.

The conferencing for each audio byte of voice data is done within one frame. The number of users does not affect the speed of the system inasmuch as there is a predetermined number of slots available for use by the conferencing circuit. Thus, if there are three users or participants to a conference, the system will use four slots. Similarly, if there are five users or participants to the conference, the system will utilize six slots. Preferably these are sequential slots wherein the audio data is combined to provide the necessary output safety within a single frame period.

The conference circuit included in this system can be understood conceptually as including a signal summer or adder for each conference participant. Thus, if there are 3 conference participants, there are three signal summers. Each summer takes the voice signals from the other two participants, sums them together and plays that summed signal to the participant associated with that summer. In effect, each port on the system has a signal summer that allows the transmit signals from any or all other ports to be added together and played for that port. Note that the port's transmit signal is never added to the signal which is played back to that port.

To implement this system, the "signal summers" are implemented as consecutive time slots on the time slot bus. Assume for example, a three participant conference. Time slots will be set up accordingly:

time slot n: participant 1 transmits to conference
time slot n+1: participant 2 transmits to conference
time slot n+2: conference circuit transmits (1+2) to participant 3

(note that "m" need not be equal to "n+3")

time slot m: participant 2 transmits to conference
time slot m+1: participant 3 transmits to conference
time slot m+2: conference circuit transmits (2+3) to participant 1

(note that "x" need not be equal to "m+3")

time slot x: participant 3 transmits to conference time slot x+1: participant 1 transmits to conference
time slot x+2: conference circuit transmits (1+3) to participant 2

The actual summers are quite simple. They are implemented with a table lookup memory 1040 (similar to the volume table except it performs the addition: output_byte=COMPRESS {EXPAND [input_byte_1] +EXPAND [input_byte_2]}), a holding register 1050 (to hold intermediate additions between successive time slots) and an 8 bit driver 1055 for sending the completed addition to the destination. A 2-1 multiplexer 1045 is included to initialize the adder as will be seen in the operation described below:

At the beginning of time slot n, the time slice memory indicates that this is an initial conference time slot and the 2-1 multiplexer is selected to take the data byte on the time slot bus (from participant 1) and place it directly in the holding register. This initializes the adder. In time slot n+1, the data from the holdoing register is applied to the adder-memory along with the data byte from the time-slice bus (from participant 2). The sum is then placed back in the holding register. The system has performed a "read-modify-write" operation on the holding register. In time slot n+2, the time slice memory tells the conference circuit that it is time to transmit the completed sum of the last 2 time slots and the sum is routed out onto the time slice bus.

Precisely the same operation occurs for the other conference participants in their corresponding time slots.

Since there is no limit on time slices, it can be seen that there is no limit on the number of conference participants or a limit on the number of simultaneous conferences.

Thus using the present conference circuit, the problems associated with analog conferencing, that is problems of drift and the large amount of analog circuitry required to handle all the possible combinations of many different lines, as well as the noise problems associated with analog conferencing, are eliminated and a real time conferencing capability, which does not restrict the number of conference participants is provided.

The invention has been described in conjunction with the preferred embodiment, numerous alternatives, modifications, variations, and uses will be apparent to those skilled in the art, in light of the foregoing description.

What is claimed is:

1. A telephone key system to operate a plurality of radio handsets, said system connecting to an external telephone system for telephonic communications with telephone systems and users external to the telephone key system, said telephone key system operating at a predetermined frame rate at which voice is transmitted to the external telephone system, said telephone key system comprising:
  a central control unit (CCU) comprising:
    an external telephone interface which connects to the external telephone system;
    at least one radio frequency (RF) interface comprising at least one radio transceiver to transmit voice and command data between the radio handsets and the CCU;
    an RF processor connected to the RF interface to control the transmission and receipt of voice/command data between the RF link and the handsets;
    a time slice bus which interconnects devices connected to the bus comprising the external telephone interface and RF interface to provide the transfer of voice data between devices and the transmission of voice data between the external telephone system and the handsets,
  bus controlling means for controlling the operation of the bus, said bus controlling means comprising,
    a clock means for dividing the frame into a plurality of slots whereby a unit of voice data can be transferred between a source device which outputs voice data on to the bus during a slot and a destination device which receives voice data output onto the bus during a slot;
    a first memory means for storing identification of source and destination devices for each time slot used, said first memory means divided into a first and second page, bus processing means for reading the identification of source and destination devices for each time slot from a page in the first memory means and enabling the corresponding source and destination devices such that the source device puts data onto the bus and the destination device latches the data from the bus during the corresponding time slot;

a main processor which writes information regarding addresses of source and destination devices for a frame into a page in the first memory means, said main processor indicating to the bus processing meand the page of the first memory means to read to access the identification of the source and destination devices, said main processor modifying the information regarding addresses of source and destination devices to be enabled during a frame by writing into the page not currently being accessed by the bus processing means and upon completion of writing to the page, notifying the bus processing means to switch and read the other page of the first memory means to access the source and destination device identification;

whereby the radio handsets communicate to the external telephone system through the CCU on a real time basis.

2. The telephone system as set forth in claim 1, wherein said radio frequency interface comprises three RF transceivers which can concurrently transmit voice and data between the CCU and three radio handsets.

3. The telephone key system as set forth in claim 2, wherein the RF processor controls the allocation of channels to each RF transceiver.

4. The telephone key system as set forth in claim 3, wherein the allocation of channels by the RF processor is achieved by the RF processor causing a digital code identifying the channel to be used to be loaded into phase lock loop circuitry of the RF transceiver which controls the frequency of operation.

5. The telephone key system as set forth in claim 1, wherein each radio handset comprises:

a handset RF frequency transceiver to transmit and receive voice and command data between the handset and the CCU;

a handset controller to control the format of voice and command data transmitted to the CCU and to extract command data from voice and command data received from the CCU;

a CODEC to translate digital data received from the CCU to analog data for output to the listening device of the handset, and to translate from analog data to digital data the voice signals received through the microphone of the handset; and a handset processor to control features and functions of the handset.

6. The telephone key system as set forth in claim 5, wherein each handset operates in a registration mode, a conversation mode, a polling mode, or a sleep mode.

7. The telephone key system as set forth in claim 6, wherein the registration mode is utilized to register the identification number with the CCU, thus providing authorization for the handset to communicate with the CCU.

8. The telephone key system as set forth in claim 6, wherein the communication conversation mode is utilized to transfer audio data between the handset and the CCU.

9. The telephone key system as set forth in claim 6, wherein the set operates in the polling mode when not communicating with the CCU and monitors a predetermined channel for a communication from the CCU directed to the handset as identified by the handset ID and transmits back to the CCU status information requested.

10. The telephone key system as set forth in claim 9, wherein the polling channel is utilized by the CCU to send ring and page audio signals as well as broadcast messages to registered handsets.

11. The telephone key system as set forth in claim 6, wherein the handset operates in the sleep mode when the handset is not in use, said sleep mode powers the handset down and periodically powers the handset up to the polling mode to determine if the handset requires to respond to a message from the CCU;

wherein the handset after determining that no response is necessary will power down the handset.

12. The telephone key system as set forth in claim 5, wherein the handset controller monitors the handset keypad to determine when a key is depressed.

13. The telephone key system as set forth in claim 12, wherein the controller further formats the packet of data sent to the CCU and interleaves voice and data in the single packet with little or no degradation in voice data for output to a UART and the handset RF transceiver for transmission to the CCU.

14. The telephone key system as set forth in claim 1, wherein the external telephone interface comprises a CODEC which, receives analog data received from the external telephone system and converts it to digital data in a format compatible with the telephone key system, and receives digital data to be output by the telephone key system to the external telephone system and translates it to analog signal format compatible with the external telephone system.

15. The telephone key system as set forth in claim 1, wherein command data and voice data are concurrently communicated between the handset and the CCU according to a data format for communicating data between the handset and the CCU comprising:

allocating a bit as a command bit which when set identifies two least significant bits of the transmitted voice data as a portion of the command data, and identifies the two least significant bits of the voice data and the command bit of the next subsequent two packets of voice data to contain the remaining portion of the command data;

whereby command data is communicated between the CCU and the handset in three packets on an as needed basis with little degradation in the quality of the voice signal.

16. The telephone key system as set forth in claim 15, wherein if voice data is not transmitted, command data is transmitted in one packet of information comprising solely command data.

17. The telephone key system as set forth in claim 15, wherein the packet of data transmitted between the handset and the CCU comprises eight data bits, one command bit, one parity bit and a terminating stop bit.

18. The telephone key system as set forth in claim 15, wherein the handset and CCU further comprise a command register which,
    stores the command data read from the packet received and means for generating an interrupt upon completion of transmission to notify the handset processor and the main processor that command data is available in the command register,
    whereby the processor can read the command data and perform functions in response to the command data.

19. The telephone key system as set forth in claim 1, further comprising a means for synchronizing the handsets to the CCU such that the clock of the CCU is in phase with the clock of the handset thereby eliminating data loss due to data overrun or data underrun, said means comprising:
    digital phase loop circuit comprising a local oscillator counter and phase delay circuit,
    control means wherein,
        if data received by the handset is invalid or no data is received, the phase delay circuit will reset the counter when the count reaches a first predetermined count value corresponding to the frame rate, thus maintaining the current frame rate,
        if valid data is received and a control bit is set, the counter will be reset by the phase delay circuit at a predetermined time reference of the data received, thereby synchronizing the handset to the CCU;
        if the received data is valid, the predetermined time reference has been received, and the control bit is not set, the phase delay circuit will reset the counter when the counter is at or around the first predetermined count value;
        if the received data is valid, the control bit is not set, the count is greater than a second predetermined count value, greater than the first predetermined count value, and the predetermined time reference has not been received, the counter is reset thereby pushing out the local frame reference toward the CCU frame reference.

20. The telephone key system as set forth in claim 19, wherein the predetermined count is 192 to correspond to a 8 kilohertz frame rate; and
    if at count 191 the predetermined time reference has already arrived from the CCU, the phase delay circuit will reset the counter thus pulling the local frame reference closer to the CCU time reference;
    if the predetermined time reference arrives between counts 191 and 192, the counter reset will occur at count 192;
    if the counter reaches 193 and the predetermined time reference has not arrived, the counter is reset regardless of the location of the time reference thereby pushing out the local frame reference towards the CCU frame reference.

21. The telephone key system as set forth in claim 1, wherein a first portion of the slots of the frame are used to place a receiving interface of a device and driving interface of a device to output data into a stable state for time of data transfer, wherein the receiving interface which received data in a prior time frame moves data from the interface into the device and the driving interface to output data during the present frame moves data from the device to the driving interface, such that at a predetermined time slot of the present frame the data in the driving interface is driven onto the bus and received by the receiving interface, whereby both driving and receiving registers are in a stable state at time of data transfer and data transfer errors are avoided.

22. A telephone key system as set forth in claim 1, wherein a frame comprises 480 slots, each slot having a duration of 260 nanoseconds, whereby a kilohertz frame is provided.

23. A telephone key system as set forth in claim 22, wherein 320 time slots are allocated to transmit audio data and 160 time slots are used to transfer commands and miscellaneous information.

24. The telephone key system as set forth in claim 1, wherein each source-destination pair of devices is assigned a predetermined time slot during which any data transfers are between that source destination pair are to take place.

25. The telephone key system as set forth in claim 1, wherein the identification of each device comprises an address and an attribute, said address identifying the device and said attribute identifying a particular portion of the device.

26. The telephone key system as set forth in claim 25, wherein the device is the external telephone interface and the attribute identifies the particular central office line the external telephone interface connects to.

27. The telephone key system as set forth in claim 1, wherein upon notification by the main processor, the bus processing means reads the other page of the first memory means at the end of the frame, and the bus processing means switches to access the other page to continue at the next frame with the updated source destination devices enabled with no effect on the timing or synchronization of bus operations.

28. The telephone key system as set forth in claim 1, wherein the first memory means further comprises a portion of the memory used by the main processor and RF processor to communicate with one another, said communication achieved by one processor writing into the portion of memory and the other processor reading from that portion of memory.

29. The telephone key system as set forth in claim 28, wherein the portion of memory used for the main processor and RF processor to communicate with one another has two sub-regions;
    the first sub-region used by the main processor to write communications to the RF processor and for the RF processor to read those communications from the main processor, and
    a second sub-region for the RF processor to write communications to the main processor and for the main processor to read communications from the RF processor.

30. The telephone key system as set forth in claim 28, further comprising a flag accessible by the main processor and RF processor, the processor communicating to another processor setting the flag after the communication is written to the portion of memory and the other processor reading communication from the portion of memory when the flag is set and resetting the flag after reading the portion of memory.

31. The telephone key system as set forth in claim 1, further comprising a second memory means comprising a table of information accessed by the main processor for maintaining the identification of the source destination device pairs which are currently utilized, said main processor referring to the second memory means to identify the source and destination devices to be written into a page of the first memory means.

32. The telephone key system as set forth in claim 1, further comprising a tone generating device to generate telephone tones that are used during operation of the telephone system, said tone generating device connected to the time slice bus for communication of audio data representative of tones, said tone generator comprising a tone generator memory for storing digital data representative of tones to be utilized during the operation of the telephone system, such that when a tone is to be generated, the tone generator outputs the data representative of the tone to the time slice bus for output to the external telephone system or radio handset.

33. The telephone key system as set forth in claim 32, wherein said tone generator further comprises:

a plurality of registers, each register coupled to receive a byte of data representative of a tone, each register identified to be output during a predetermined time slot, each byte of the tone data being output to the registers during a single frame for a plurality of devices requiring the generation of tones, the next byte of information to be generated for a tone being subsequently stored to the register to be output in the next frame, whereby a continuous sequence of data to be output as a series of tones for a plurality of devices is achieved with no audible degradation in tone generation.

34. A telephone key system as set forth in claim 1, further comprising a volume device connected to the time slice bus for increasing or decreasing the audio volume, said volume device comprising a memory, comprising a series of look-up tables, each table corresponding to a different volume setting, whereby audio data is modified by the volume device to reflect an increase or decrease in volume by using the audio data to index to the table to read modified data comprising audio data as modified by the volume increase or decrease.

35. A telephone key system as set forth in claim 1, further comprising a conferencing circuit device for providing a telephone conference capability among conference participants, wherein in a particular frame audio data is conferenced by summing the audio data of conference participants for a particular frame and outputting the summed audio data on the time slice bus to the RF or external telephone interface.

36. A telephone key system as set forth in claim 35, wherein the audio data are summed in one frame by utilizing a plurality of consecutive time slots on the time slice bus, the first two summed audio data, reflective of the audio of the first two conference participants, are received by the conferencing circuit device during a first two time slots, said conferencing circuit device summing the audio data and storing the sum and receiving a third audio data during a third time slot indicative of the audio data of a third conference participant, whereby the summed audio data and third audio data are summed, said process continuing until all audio bytes for conference participants are read and summed for output during a subsequent time slot.

37. A telephone key system as set forth in claim 35, wherein the audio data are summed by look-up tables, the audio data to be summed being used to respectively identify the lookup tables and identify the entry in the look-up table containing the precomputed values for that possible summed combination of audio data.

* * * * *